US00RE40943E

(19) United States
(12) Reissued Patent
Brunsell

(10) Patent Number: US RE40,943 E
(45) Date of Reissued Patent: Oct. 27, 2009

(54) METHOD IN TREATING AQUEOUS WASTE FEEDSTREAM FOR IMPROVING THE FLUX RATES, CLEANING AND THE USEFUL LIFE OF FILTER MEDIA

(75) Inventor: Dennis A. Brunsell, Knoxville, TN (US)

(73) Assignee: Diversified Technologies Services, Inc., Knoxville, TN (US)

(21) Appl. No.: 11/211,027

(22) Filed: Aug. 24, 2005

Related U.S. Patent Documents

Reissue of:
(64) Patent No.: 6,755,977
Issued: Jun. 29, 2004
Appl. No.: 10/176,428
Filed: Jun. 19, 2002

(51) Int. Cl.
*C02F 1/78* (2006.01)
*B01D 65/06* (2006.01)

(52) U.S. Cl. ..... 210/648; 210/760; 210/797; 210/808

(58) Field of Classification Search ..... 210/746, 210/760, 791, 797, 805, 808, 648; 422/186.08
See application file for complete search history.

(56) References Cited

U.S. PATENT DOCUMENTS 4,252,654 A 2/1981 Leitzke
4,255,257 A 3/1981 Greiner
4,595,498 A * 6/1986 Cohen et al. ..... 210/192

(Continued)

FOREIGN PATENT DOCUMENTS

JP 57-194005 A * 11/1982
JP 04-310220 A * 11/1992
JP 2001-070764 A * 3/2001
JP 2001-219165 A * 8/2001

OTHER PUBLICATIONS

Faust, S.D. and Aly, O.M., 1998, "Chemistry of Water Treatment," pp. 292–298, Ann Arbor Press: Chelsea, Michigan.*
Overbeck, P, "Ozone Treatment of Small Water Systems", GDT Website(http://www.gdt–h2o.com) Oct. 20, 1998, pp. 3.8–13, 17–18, 20; Canada.
Overbeck, P, Jackson, J, "Innovative Deoxygenation of Ozonated Water" GDT Web(http://www.gdt–h2o.com) Aug. 25, 1999, p. 3, Dearborn, Michigan.
Jackson, J, "Dissolved Oxygen Control by Pressurized Side Stream Ozone Contacting and Degassing" GDT Web (above), Aug. 24, 1999, pp. 1, 3, 13, Dearborn, Mich.
GDT Internet Advertising, "High Efficiency Ozone Contacting" GDT Web(above) Jan. 6, 2000, pp. 1–2.
GDT Internet Advertising, "The GDT(TM) Process" GDT Web(above), Jan. 6, 2000, pp. 1–2.

(Continued)

*Primary Examiner*—Frank M Lawrence
(74) *Attorney, Agent, or Firm*—Monroe Alex Brown Patent Attorney

(57) ABSTRACT

A method in treating aqueous feedstream in diverse plant site environments is disclosed for improving filter flux rates, cleaning filter media and prolonging useful operative life of media. In preferred embodiments the method is provided with steps for contacting, reacting, pressurizing and equalizing ozone and feedstream within a central area or multiple areas and sustaining high pressure throughout the system to achieve qualitatively and quantitatively improved permeate products, and reject for recycle. The method and system provide an improved cleaning and processing system characterized by an ozone-concentrated, homogeneous single phase liquid conversion of a generated ozone gas mixture and a feedstream source containing organic and inorganic pollutants. The method improves and monitors ozone oxidizing power and reflecting ORP values, and provides further media cleaning and improved oxidation reactions for attack on pollutants on each cycle/recycle operation.

76 Claims, 7 Drawing Sheets

U.S. PATENT DOCUMENTS

| | | | | | |
|---|---|---|---|---|---|
| 4,622,151 | A | * | 11/1986 | Hiltebrand et al. | 210/739 |
| 4,849,115 | A | * | 7/1989 | Cole et al. | 210/748 |
| 4,898,679 | A | | 2/1990 | Siegel | |
| 5,097,556 | A | * | 3/1992 | Engel et al. | 8/158 |
| 5,114,576 | A | * | 5/1992 | Ditzler et al. | 210/195.1 |
| 5,271,830 | A | * | 12/1993 | Faivre et al. | 210/151 |
| 5,302,288 | A | | 4/1994 | Meidl | |
| 5,336,413 | A | * | 8/1994 | van Staveren | 210/650 |
| 5,348,664 | A | * | 9/1994 | Kim et al. | 210/746 |
| 5,364,537 | A | | 11/1994 | Paillard | |
| 5,397,480 | A | * | 3/1995 | Dickerson | 210/752 |
| 5,431,861 | A | | 7/1995 | Nagahiro | |
| 5,518,624 | A | | 5/1996 | Filson | |
| 5,580,458 | A | * | 12/1996 | Yamasaki et al. | 210/609 |
| 5,593,598 | A | * | 1/1997 | McGinness et al. | 210/748 |
| 5,607,593 | A | | 3/1997 | Cote | |
| 5,645,727 | A | | 7/1997 | Bhave | |
| 5,645,797 | A | | 7/1997 | Lo | |
| 5,651,939 | A | | 7/1997 | Murrier | |
| 5,674,312 | A | | 10/1997 | Mazzei | |
| 5,683,576 | A | | 11/1997 | Olsen | |
| 5,741,416 | A | | 4/1998 | Tempest | |
| 5,843,307 | A | * | 12/1998 | Faivre et al. | 210/192 |
| 6,001,247 | A | * | 12/1999 | Schulz | 210/192 |
| 6,074,564 | A | * | 6/2000 | Foellmi | 210/760 |
| 6,117,334 | A | | 9/2000 | Coury | |
| 6,162,477 | A | * | 12/2000 | Crisinel et al. | 426/256 |
| 6,183,646 | B1 | * | 2/2001 | Williams et al. | 210/636 |
| 6,186,170 | B1 | * | 2/2001 | Koganezawa et al. | 137/563 |
| 6,773,609 | B1 | | 5/2001 | Hashizume | |
| 6,299,761 | B1 | | 10/2001 | Wang | |
| 6,361,697 | B1 | | 3/2002 | Coury | |
| 6,416,668 | B1 | * | 7/2002 | Al-Samadi | 210/636 |
| 6,458,257 | B1 | | 10/2002 | Andrews | |
| 6,506,309 | B1 | * | 1/2003 | Daniels et al. | 210/760 |
| 6,551,490 | B2 | * | 4/2003 | Andrews et al. | 205/626 |
| 6,585,898 | B1 | * | 7/2003 | Ekberg et al. | 210/760 |

OTHER PUBLICATIONS

Overbeck, P, Mazzei, A, "High Efficiency In–Line Pressurized Ozone Contacting With The GDT(TM) Process" Web, Apr. 22, 1997, Berlin, Germany.

Press Release, "GDT(TM) Ozone Contacting System Selected for 15% wt. Municipal Project", GDT Web, Jan. 12, 2000, p. 1 USA.

Press Release, "Efficient Solution to Water Treatment Challenges", GDT Web, Jan. 12, 2000 USA.

Press Release, "Advanced Water Treatment Company Formed From Strategic Technical Alliance", GDT Web, jan. 12, 2000 USA.

Jackson, J, Overbeck, P, "Ozone Pipe–line Gasification–Degasification Treatment (GDT {TM}Performance in Portable Water Treatment Plants" GDT Web, Aug. 16, 1997, Lake Tahoe, Nev.

Langlais, B. et al., (cds), 1991, *Ozone In Water Treatment Application and Engineering*, pp. 190–203, Lewis Publishers: Chelsea, Michigan.*

Drosie, R.I., 1997, *Theory And Practice Of Water And Wastewater Treatment*, pp. 450–451 and 527–530, John Wiley & Sons; New York.*

Mallevialle, J. et al., 1992, *Influence and Removal of Organics in Drinking Water*, pp. 326–332, Lewis Publishers: Boca Raton.*

Vigneswaren, D., et al., *Water, Wastewater, and Sludge Filtration*, pp. 61–65, CRC Press, Inc.: Boca Raton, 1989.*

Faust, S.D. and Aly, O.M., 1998, *Chemistry of Water Treatment*, pp. 292–298, Ann Arbor Press: Chelsea, Michigan.*

* cited by examiner

METHOD IN TREATING AQUEOUS WASTE FEEDSTREAM FOR IMPROVING THE FLUX RATES, CLEANING AND THE USEFUL LIFE OF FILTER MEDIA

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to the use of ozone to treat and process aqueous waste feedstream, especially as this would relate to treatment at filtration plant facilities; but also in other uses, where the concern or object exists to improve flux rates of feedstream through filter media and effectively change feedstream character so that it is presented in a condition where it will cause less wear or destruction of such media, and provide the added feature of effectively cleaning such filter media.

2. Background Information

It has been determined in the art that Ozone kills many biological agents by oxidizing the organic molecules that form the cell surface and in dealing with the problem of calcium buildup (a major portion of total dissolved solids—TDS), as well as dealing in the past with biocides used to chemically treat water systems.

Those references found which appear to have at least some relationship to the technology of ozone treatment and processing of environmentally significant aqueous waste feedstream including the fllowing: Williams, et al., U.S. Pat. No. 6,183,646; Crisinel, et al., U.S. Pat. No. 6,162,477; Foellmi, U.S. Pat. No. 6,074,564; Shultz, U.S. Pat. No. 6,001,247; Faivre, et al., U.S. Pat. Nos. 5,843,307 and 5,271,830; Busch, Jr., U.S. Pat. No. 5,807,486; Tempest, Jr., U.S. Pat. No. 5,741,416; Bhave, et al., U.S. Pat. No. 5,645,727; Dickerson, U.S. Pat. No. 5,397,480; Ditzler et al., U.S. Pat. No. 5,114,576; Engel et al., U.S. Pat. No. 5,097,556; Cole, et al., U.S. Pat. No. 4,849,115; Hiltebrand, et al., U.S. Pat. No. 4,622,151; Cohen, et al., U.S. Pat. No. 4,595,498; and Johnson, et al., U.S. Pat. No. 4,200,526.

Also having some relevance in terms of discussing some of the chemical principles involved in the present invention's technology (such as solubility aspects, pressure and the application of the Laws of Boyle, Charles, Dalton and Henry, and other chemical aspects), are the following references: (1) Various editions of Lange's Handbook of Chemistry, setting forth the "Solubility of Gases in Water," particularly as this relates to Oxygen and Air into Water or Water and Solvents; (2) Graik, et al., 2001, "The Effect of Ozone Gas-Liquid Contacting Conditions in a Static Mixer on Microorganism Reduction," Ozone Science & Engineering, Vol. 23, pp. 91–103; (3) Min Cho et al., 2001, "Effect of pH and Importance of Ozone initiated Radical Reactions In Inactivating Bacillus subtilis Spore," Ozone Science & Engineering, Vol. 24, pp. 145–150; (4) Mortimer, C. H., 1981, "The oxygen content of air-saturated fresh waters over ranges of temperature and atmospheric pressure of limnological interest," International Association Of Theoretical And Applied Limnology, pp. 1–23, E. Schweizerbart'sche Verlagsbuchhandlung: Stuttgart; (5) Langlais, et al. (eds.), 1991, Ozone In Water Treatment Application and Engineering, pp. 90–132, 349–442, 474–485 and 543–551; (6) Masschelein, W. J. (ed.), 1982, Ozonization Manual for Water and Wastewater Treatment, pp. 47–56, 69–102, 129–139, and 151–153, John Wiley & Sons: New York; (7) Gerrard, w\W., 1976, Solubility Of Gases and Liquids, pp. 1–276, Elsevier Scientific Publishing Company: New York; (9) Lide, D. R. (ed.), 1995–1996, "Vapor Pressure Of Fluids At Temperatures Below 300K—Ozone ($O_3$)", CRC Handbook of Chemistry and Physics, p. 6–71, CRC Press: New York; and (10) Linke, W. F., 1965, "$O_3$ Ozone Solubility In Water," Solubilities Inorganic and Metal-Organic Compounds, pp. 1239–1240, American Chemical Society: Washington, D. C.

The Faivre et al. '307 and '830 patent references would appear to be the closest potentially applicable prior art. The '307 reference is entitled: "Unit for the treatment of water by ozonation, and a corresponding installation for the production of ozonized water." The '830 reference is entitled: "Water treatment installation for a tangential filtration loop." These references teach a water treatment unit and installation designed expressly for the purpose of producing "ozonated white water," or water characterized by a multi-phase, non-homogeneous mixed system containing gaseous "bubbles" of ozone within the water, giving the water the appearance of turbulent 'white' water, and disclosed to have bubbles the size of between 20 and 200 microns, or larger in magnitude by virtue of the visibility to the naked eye of bubbled white water as described in Faivre.

The bubbles and white water of the Faivre teachings are designed to create physical turbulence in the water at the membrane, and employ the ability of ozone, in such a gaseous state, as an oxidation agent to further restrict clogging of their tangential filtration membrane. Such installations or units require a reduction in initial pumping pressure to form gaseous ozone bubbles, and a phase separation to prevent cavitation of pumping units and other equipment on line by virtue of Faivre's feedstream being at a point of supersaturation with the presence of potentially damaging gaseous bubbles; therefore, exposing such a system to the loss of useful ozone content, even in the form of the gas bubbles earlier created, as well as further time and expense in reinstating gaseous ozone bubble concentrations with regard to any recycling operations. The pressure in the Faivre installation must be dropped some 50% to 75% before reaching any filter unit to form Faivre's ozone gas bubbles. The unit or installation system of Faivre cannot sustain useful pressure throughout its system loop, from beginning to end, during any given cycle of its application or operation. This loss in pressure will decrease potential flow rate across tangential membranes along with significant reduction in turbulence. Nor can it recycle, as indicated, without losing its gaseous 'white water-bubbled ozone and starting from the beginning in re-generating its gaseous ozone bubbles or white water. These systems, therefore, lose their ability to effectively clean filter media because gaseous bubbled ozone, multi-phase fluid or suspension is submitted not to be an optimal form for effectively cleaning and saving wear on filter media. Nor is it effective and cost-saving in re-utilization through re-cycling because of the required reduction in pressure to form ozone bubbles and the phase separation required to protect against cavitation and other phase separation damage to pumps and other such equipment within Faivre's loop, or other equipment utilized on-line. This is born out by its relative or substantial obscurity of use in any environmental system employing filter media in the United States. Additionally, the teachings of Faivre would suggest, chemically, that its unit, installation or system, is sensitive to temperature and pH requirements because of the nature of its gaseous multi-phase mixture; thereby inherently involving greater potential for failure or demanding greater time and expense to maintain.

These and other disadvantages, structurally, functionally and by virtue of distinction in process and method approach, will become apparent in reviewing the remainder of the present specification, claims and drawings.

Accordingly, it is an object of the present invention to provide a substantially improved and cost-effective method in treating aqueous waste feedstream for improving the flux rates, cleaning and prolongation of useful life of filter media in many diverse environmental and process applications; with special adaptability and advantageous application to aqueous feedstreams from nuclear plant sites.

It is a further object of the present invention to provide a method which utilizes the solubilizing (or the making soluble and uniform) of an ozone mixture (provided as having at least $O_3$ and $O_2$) and an aqueous feedstream to create a substantially homogeneous single phase liquid mixture or a substantially homogeneous molecular single phase mixture, without 'white water' or ozone bubbles; so that the ozone mixture generated within the present process and the aqueous feedstream to which it is applied are dissolved and miscible, one with the other, at a level below the saturation point of the generated ozone mixture (rather that at point of supersaturation); thus making it a more active and concentrated ozone solution system (with greater oxidizing power and cleaning ability).

It is yet a further object to provide a system and process of dissolving and solubilizing ozone in an aqueous feedstream to produce a substantially single phase liquid system which will not damage filter media, pumps and like units on-line; and which can be maintained at a desired or higher pressure throughout the system on-line, from the beginning to the end of a complete given cycle, for maximizing the positive effect of the concentrated active oxidation or oxidizing power of such a single phase liquid system on a filter media; through enhanced cleaning, improved flux rates, improved quality and volume amount of effluent permeate, and the ability to recycle reject volumes for further cleaning and oxidation exposure without having to lower the pressure on-line.

It is a further object of the present invention to provide a solubilized ozoneaqueous feedstream system which will have greater ozone concentration and oxidation activity at the surfaces of filter membranes or other filter media surfacing, for improved cleaning and prolonged useful life; while also serving functionally to cost-effectively facilitate greater amounts of permeate, faster re-cycling rates and greater volume movement potential throughout the system in relation to time.

It is yet a further object of the present invention to provide a method and system which will operate well at various pH and temperature ranges or ambient conditions at a given site.

It is an additional object of the present invention to sustain a workable higher pressure above atmospheric pressure throughout the on-line system and installation constituted in accordance with the present invention, to achieve the most optimal concentration and resulting activity of ozone in solution with an aqueous feedstream so that the full advantages of utilizing ozone to clean and prolong the life of otherwise expensive filter media are realized in that:

(1) Since ozone is generated by an electrical discharge into oxygen (supplied as plant air), no handling of hazardous chemical is required, with a flip of a switch beginning ozone production;

(2) Ozone has a much higher oxidation potential than hypochlorite (free chlorine) or hydrogen peroxide, which means that it reacts faster and attacks organics at a much higher rate;

(3) Ozone decomposes to oxygen, so no chemical contaminants (e.g., sodium chloride or chloramines) will affect downstream ion exchange performance or capacity;

(4) Ozone has a half-life of approximately 20 to 30 minutes, so there is no credible scenario for it to be found in plant effluent; and (5) Ozone dissolved in water is less aggressive to Tubular Ultra Filtration, Cross-Flow Membrane Media or other filtration means or units than hypochlorite or like chemicals or substances. Therefore, the use of ozone can enhance membrane life and reduce membrane fouling and frequency of cleaning, while maintaining a higher flux rate.

It will, therefore, be understood that substantial and distinguishable process and functional advantages are realized in the present invention over the prior art; and that the present invention's efficiency and adaptability of operation, diverse utility, and broad functional applications serve as important bases of novelty and distinction in this regard.

SUMMARY OF THE INVENTION

The foregoing and other objects of the invention can be achieved with the present invention, method, process and system which is a method and system for processing organic pollutants, and inorganic foulants in a reduced oxidative state, of an aqueous feedstream, for increasing flux rates across a filtration membrane, and for cleaning and prolonging the useful life of filtration and filter membrane installations.

The method and system of the present invention is provided with step (a) which includes: directing, channeling and pumping an aqueous feedstream having waste contaminants, from a feed water area to a reactor area for contacting, reacting, pressurizing and equalizing the aqueous feedstream, and concentrating solids and removing solids from the aqueous feedstream.

The method is further provided with step (b): generating an ozone mixture having at least $O_3$ and $O_2$, dissolving the ozone mixture into the aqueous feedstream under a pressure gradient having an alpha pressure, contacting the aqueous feedstream with the ozone mixture such that the aqueous feedstream is exposed for increased reaction of the ozone and concentrating and collecting solids at a bottom portion of the processing area.

Step (c) of the present invention includes: directing the aqueous feedstream from the reactor area and measuring ozone activity of the aqueous feedstream.

Step (d) includes: conveying the aqueous feedstream to a pumping area.

Step (e) comprises: pumping the aqueous feedstream to a filtration area having filter media, an inflow portion subarea and an outflow portion subarea, respectively, before and after the filter media.

Step (f) of the present method and system of the invention includes: marshaling an effluent portion volume of the aqueous feedstream passing through the filter media of the filtration area to the outflow portion subarea, and advancing and measuring ozone activity of the effluent portion volume, and the volume and amount of the effluent portion volume; and Step (g): advancing the effluent portion to a preselected site.

REFERENCE NUMBERS

Figure 1:
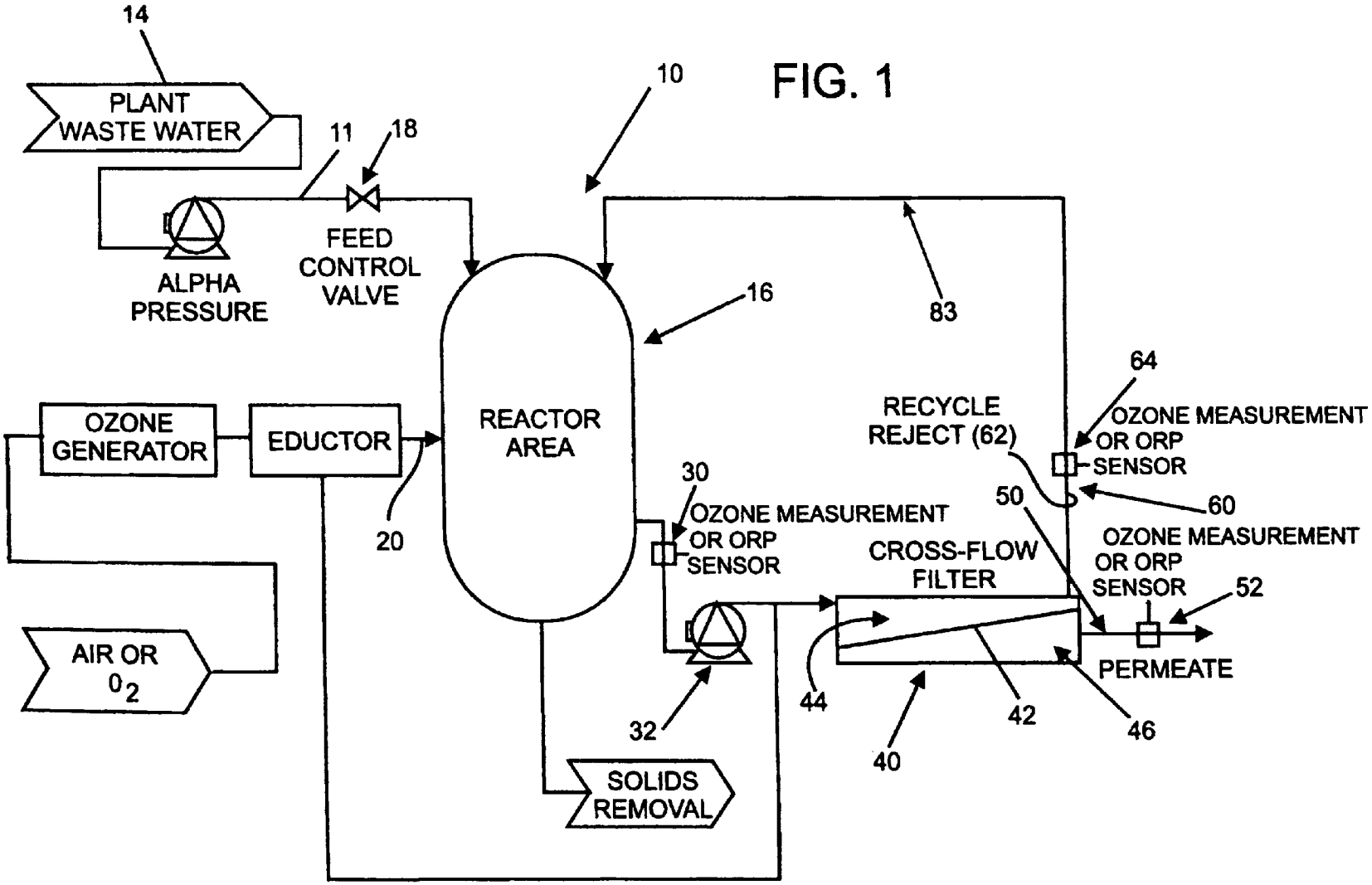
FIG. 1 is an exemplar flow diagram and schematic illustration of a preferred embodiment of the novel and substantially improved method in treating aqueous waste feedstream for improving the flux rates, cleaning and useful life of filter media of the present invention.

10 Ozone method (Present Method System or Installation)
11 aqueous waste feedstream (or aqueous feedstream from 14)
14 plant or site waste water source area
16 Reactor Area
18 feed control valve (or equalizer volume-amount valve or tank equalizer)
20 $O_3/O_2$ mixture (ozone mixture)
alpha pressure at which feedstream is pumped into Reactor Area (16) and Reactor (72) in preferred embodiments of the invention
16A temporary or intermediary upper area of (16) (FIG. 4)
16B temporary or intermediary lower area of (16) (FIG. 4)
16C top portion of (16) (FIG. 5)
16D lower portion (16) (FIG. 5)
30 *ozone measurement or ORP* sensor area
32 pumping area
40 filtration area
42 filter media (filter membrane)
44 inflow side portion subarea
46 outflow side portion subarea
50 effluent permeate portion volume
52 *ozone measurement or ORP* sensor area
60 reject portion volume
62 recycle line (recycle reject line)
64 *ozone measurement or ORP* sensor area
70 dissolving area
72 Reactor (another preferred embodiment)(FIGS. 2 and 3)
74 Recycle Tank (FIGS. 2 and 3)
76 *ozone measurement or* ORP sensor
78 back pressure valve (BPV)
80 ozone *measurement* or ORP sensor
82 Recycle booster pump
83 recycle line
84 further back pressure valve
86 further ozone *measurement* or ORP sensor

DETAILED DESCRIPTION OF THE PREFERRED EMBODIMENTS OF THE INVENTION

The following description of the preferred embodiments of the concepts and teaching of the present invention is made in reference to the accompanying drawing figures which constitute illustrated schematic examples of the methodical, systematic and functional elements of the present invention, among many other examples existing within the scope and spirit of the invention.

Referring now to the drawings, FIGS. 1, 2 and 3, thereof, there is diagrammatically illustrated an ozone method, process, installation and system in treating aqueous waste feedstream for improving the flux rates, cleaning and the prolongation of the useful life of filter membrane units and filter media [10] *42*, of the present invention; referred to hereinafter as the Ozone Method (or Present Method or System) 10.

*As indicated, hazardous chemicals and substances can be involved in dealing with aqueous waste feedstreams associated with a manufacturing plant, nuclear plant site or other facility producing aqueous waste having organic or inorganic pollutants and foulants; regarding which the present invention process is directed. The U.S. Environmental Protection Agency's (EPA's) regulations establish two ways of identifying solid wastes as hazardous under the RCRA (Resource Conservation and Recovery Act, enacted in 1976). A waste may be considered hazardous if it exhibits certain hazardous properties ("characteristics") or if it is included on a specific list of wastes EPA has determined are hazardous ("listing" a waste as hazardous) because the EPA found them to pose substantial present or potential hazards to human health or the environment. EPA's regulations in the Code of Federal Regulations (40 CFR) define four hazardous waste characteristic properties: ignitability, corrosivity, reactivity, or toxicity (see 40 CFR 261.21-261.24). For example, an aqueous waste feedstream associated with a nuclear plant site can and often does include "corrosion products" or corrosion materials (See, for example, EPA referenced publications: Gorby, Y. A., G. G. Geesey, F. Caccavo, Jr., AND J. K. Fredrickson, MICROBIALLY PROMOTED SOLUBILIZATION OF STEEL CORROSION PRODUCTS AND FATE OF ASSOCIATED ACTINIDES. Pacific Northwest National Laboratory, Richland, Wash., 2000 and Ewing, R. C., "Corrosion of Spent Nuclear Fuel: The Long-Term Assessment", Federal Annual Grant Report (Sep. 15, 2000 to Jun. 15, 2001), Environmental Management Science Program, Univ. of Michigan.*

*Other criteria for hazardous wastes are set out in 40 CFR Part 266 and other related statutes and regulations. Also set forth in this regard are requirements for verification by various forms of representative testing or sampling. See, for example: Environmental Protection Agency (EPA). 1980b. Samplers and Sampling Procedures for Hazardous Waste Streams, EPA-600/2-80-018, EPA, Washington, D.C. (PB80-135353).*

*Terms utilized herein, or implied by their common understanding by those skilled in the art, have been defined by their conventional definitions, as set forth by standard dictionary/glossary and EPA or USGS references known by, or readily accessible to, those skilled in the art, for example, as follows:*

*contaminant—A substance in water of public health or welfare concern. Also, an undesirable substance not normally present, or an unusually high concentration of a naturally occurring substance, in water, soil, or other environmental medium. Contamination of water involves impairment of the quality of water sources by industrial waste or other matter.*

*pollutant—Something that pollutes, especially a waste material that contaminates air, soil, or water. Any substance of such character and in such quantities that when it reaches a body of water, soil, or air, it is degrading in effect so as to impair their usefulness or render them offensive. Any solute or cause of change in physical properties that renders water unfit for a given use.*

*pollution—Any alteration in the character or quality of the environment which renders it unfit or less suited for cer-*

*tain uses. With respect to water, the alteration of the physical, chemical, or biological properties by the introduction of any substance that adversely affects any beneficial use. Under the Clean Water Act (CWA), for example, the term is defined as the manmade or man-induced alteration of the physical, biological, chemical, and radiological integrity of water.*

*wastewater—A combination of liquid and water-carried pollutants from homes, businesses, industries, or farms; a mixture of water and dissolved or suspended solids.*

*hazardous material, waste or chemical is a substance, pollutant or contaminant listed as hazardous under the Comprehensive Environmental Response, Compensation, and Liability Act (CERCLA) of 1980, as amended, and the regulations promulgated pursuant to that act. Hazardous Substance is any material that poses a threat to human health and/or the environment. Typical hazardous substances are toxic, corrosive, ignitable, explosive, or chemically reactive. Any substance designated by the U.S. Environmental Protection Agency (EPA) to be reported if a designated quantity of the substance is spilled in the waters of the United States or if otherwise released into the environment. Water Words Dictionary, NEVADA DIVISION OF WATER PLANNING, published with all supporting references prior to 2001, and cited and referenced by the USGS Water Science Glossary of Terms.*

*foulant: the accumulation of undesirable foreign matter in a filter or ion exchange media bed causing clogging of pores or coating of surfaces and inhibiting or limiting the proper operation of the bed and the treatment system; and a phenomenon in which a reverse osmosis or ultrafiltration membrane adsorbs, interacts with, or becomes coated by solutes and/or precipitates in the feed stream resulting in a decrease in membrane performance by lowering the flux and/or affecting the rejection of solutes. (WQA) Glossary of Terms, Glossary Reference 1999, Water Quality Association, Lisle, Ill.*

*organic matter—Chemical substances of animal or vegetable origin, or more correctly, of basically carbon structure, comprising compounds consisting of hydrocarbons and their derivatives.*

*conventional pollutants: Statutorily listed pollutants understood well by scientists. These may be in the form of organic waste, sediment, acid, bacteria, viruses, nutrients, oil and grease, or heat.*

*dissolved solids: Disintegrated organic and inorganic material in water. Excessive amounts make water unfit to drink or use in industrial processes.*

*grab sample: A single sample collected at a particular time and place that represents the composition of the water, air, or soil only at that time and place. A Sampler is a device used with or without flow measurement to obtain a portion of water or waste for analytical purposes.*

*oils and grease is a common term used to include fats, oils, waxes, and related constituents found in wastewater. Grease, itself, in wastewater, involves a group of substances including fats, waxes, free fatty acids, calcium and magnesium soaps, mineral oils, and certain other nonfatty materials. EPA Terms of Environment Glossary, Abbreviations, and Acronyms, EPA 175-B-97-001 (Revised December, 1997); Environmental Engineering Dictionary and Directory, Pankratz, T. M., Lewis Publishers, 2001; and GLOSSARY WATER AND WASTEWATER CONTROL ENGINEERING (Ed., Ingram, W. T., et al., Water Pollution Control Federation et al., 1969.*

*Inorganic contaminant (IOC): An inorganic substance regulated by the US Environmental Protection Agency in terms of compliance monitoring for drinking water. Contained on the agency's list are contaminants as diverse as asbestos, nitrate (NOsub.3⁻), cyanide, and nickel. An inorganic contaminant is sometimes called an inorganic chemical. Mineral-based compounds such as metals, nitrates, and asbestos. These contaminants are naturally-occurring in some water, but can also get into water through farming, chemical manufacturing, and other human activities. EPA has set legal limits on 15 inorganic contaminants. Inorganic waste includes discarded material such as sand, salt, iron, calcium, and other mineral materials.*

*monitoring: Testing that water systems must perform to detect and measure contaminants. A water system that does not follow EPA's monitoring methodology or schedule is in violation, and may be subjected to legal action.*

*organic contaminants: Carbon-based chemicals, such as, for example, solvents and pesticides, which can get into water through runoff from cropland or discharge from factories. EPA has set legal limits on 56 organic contaminants.*

*sample: The water that is analyzed for the presence of EPA-regulated drinking water contaminants. Depending on the regulation, EPA requires water systems and states to take samples from source water, from water leaving the treatment facility, or from the taps of selected consumers.*

*corrosion: The dissolution and wearing away of metal caused by a chemical reaction such as between water and the pipes, chemicals touching a metal surface, or contact between two metals. The Drinking Water Dictionary, (Ed. Talley, D et al.), American Water Works Association, 2000; Ground Water & Drinking Water—Drinking Water Glossary and A Dictionary of Technical and Legal Terms Related to Drinking Water, EPA Publications; and EPA Terms Of Environment Glossary, Abbreviations, and Acronyms, EPA 175-B-97-001 (Revised December, 1997 and as updated).*

The Ozone Method 10 is utilized for environmentally processing organic pollutants and inorganic pollutants (or foulants) having or characterized chemically by a reduced oxidative state, which are part (or part and parcel) of an aqueous waste feedstream associated with a manufacturing, plant, nuclear plant site or other facility producing aqueous waste.

The Present Method 10 is utilized to increase flux rates across a filtration membrane, [(or filter media)] *or other filter installation*, for cleaning such a membrane *media* or [media] *installation*; and for prolonging and extending the useful operative life of such [filter media] *filtration systems*. These useful applications apply to many diverse types of filter media[, and] *and installations, but* have been found to work well with cross-flow filter media and tubular membrane media[,] over a wide range of pH values and temperatures (with 50 to 140 degrees F. being preferred when ambient conditions permit).

Figure 4:
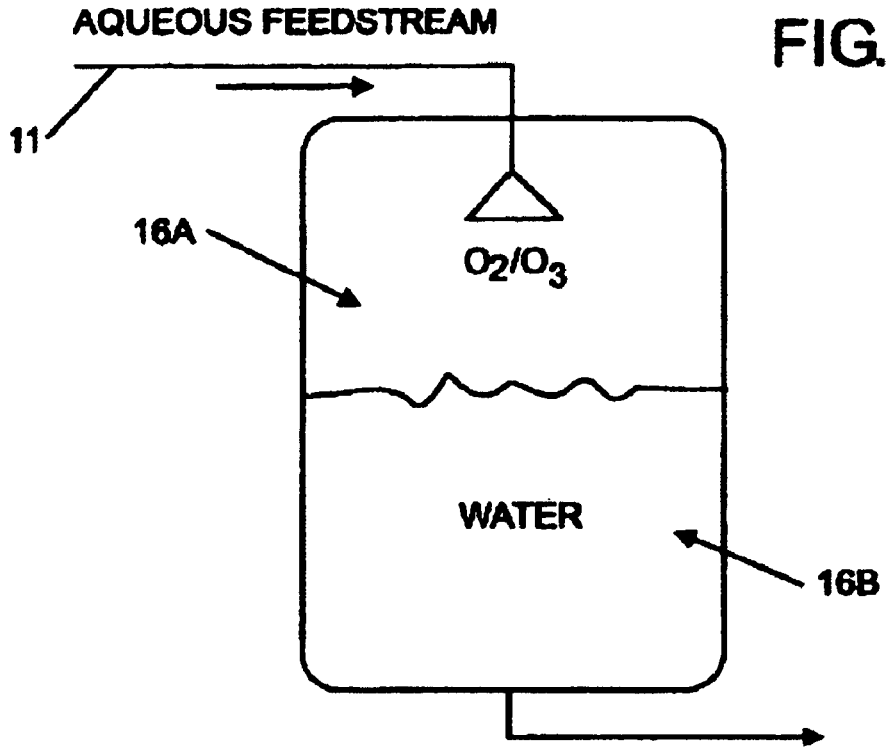
FIG. 4 is an exemplar schematic diagram illustrating one of the preferred embodiments of the Reactor Area of the embodiment of the present invention illustrated in FIG. 1.
Figure 5:
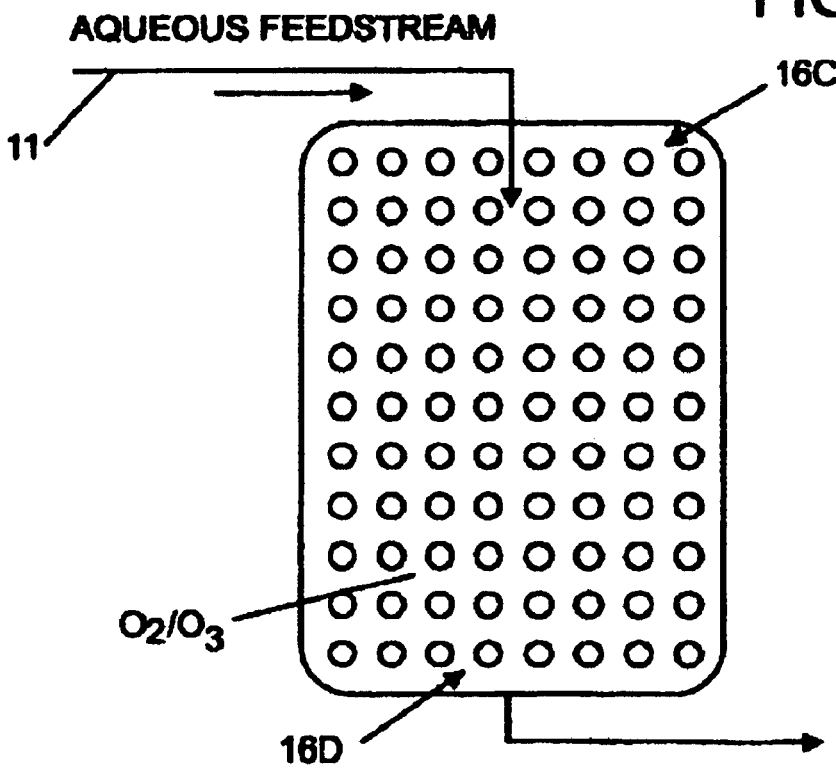
FIG. 5 is an exemplar schematic, diagrammatic illustration of another preferred embodiment of the Reactor Area utilized in the embodiment of the present invention illustrated in FIG. 1.
Figure 6:
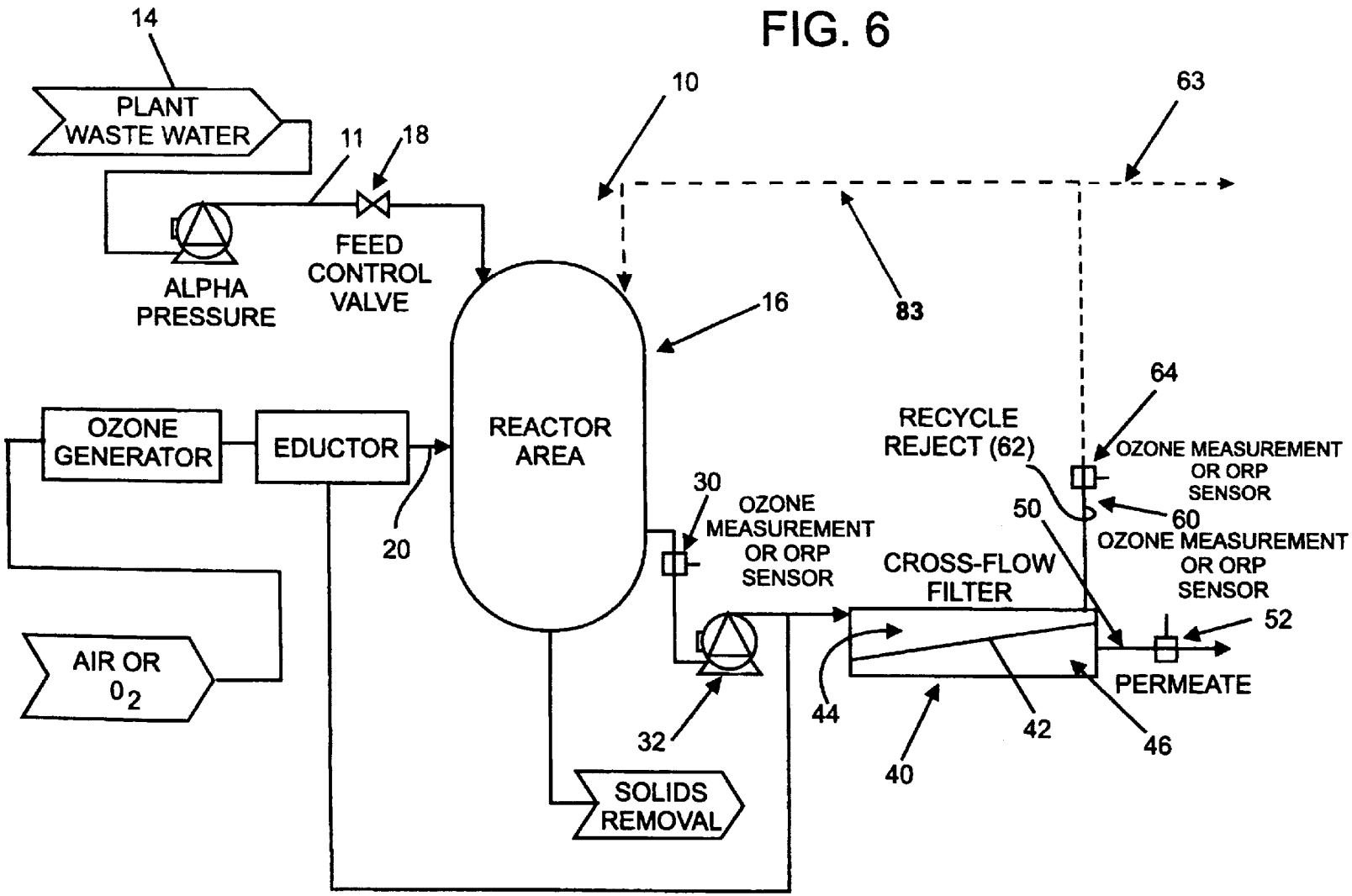
*FIG. 6 is an exemplar schematic, diagrammatic illustration of preferred embodiment of the present invention related to that of FIG. 1.*

The Ozone Method 10 is provided with the initiating step of directing, channeling and pumping an aqueous waste feedstream, shown generally at 11 (and as a line passing through the present system), having waste contaminants from a plant or site waste water source area 14 associated with a plant or other facility; to a Reactor Area 16, shown by example in FIGS. 1, 4 and 5. Additionally, the site waste water source area 14 can, in fact, be any body of aqueous liquid or fluid which is the subject or target of cleaning, purifying or a filtration process. Many aqueous food liquids, solutions or fluids such as juice, soups and other foods could be included, as well as any aqueous body to be cleaned. The Reactor Area 16 is utilized in the method and system of the present invention and installation for the purpose of contacting, reacting, pressurizing and equalizing (on re-cycle) the aqueous feedstream 11 passing through the Present System 10; and for concentrating solids within the aqueous feedstream 11. The feedstream 11 is diagrammatically illustrated as passing through the illustrated method and system diagram or flow chart, and will be understood by those skilled in the art. The Reactor 16 is provided as a tank, vessel, container, receptacle or reservoir which can function with pressures above 2000 PSIG. (pounds per square inch, gauge, versus absolute pressure, also shown herein by the designation "p.s.i.g.") in magnitude.

The aqueous feedstream 11 is taken from a [plant waste water site 16] *plant or site waste water area 14* and pumped at a pressure (referred to herein as the alpha pressure) of from about 10 to about 150 PSIG (or higher), or a preferred range of from about 30 to 50 PSIG (depending on the qualitative and quantitative nature of the feedstream 11) to a feed control (or equalizer-volume-amount tank) valve 18 (or gauge); and then to the Reactor 16. It will be understood within the scope and spirit of the present invention that the valve or gauge 18 can be positioned or installed with a positional orientation outside of, within and/or adjacent or beside the Reactor 16. The use of much higher alpha pressures of 100 PSIG to 2000 PSIG can be employed, as indicated, with regard to, and use of, some of the newer filter media becoming available in this technology.

The valve 18 is utilized initially to meter, measure or quantitate a selected or preselected volume or amount of aqueous feedstream 11; and will generally (depending on the site) have a starting amount of, for example, about 300 to 400 gallons (or equivalent volume) of feedstream 11. It will be understood within the scope of the present invention that this volume or amount can also be less or considerably more. This amount of aqueous feedstream 11 will, therefore, be directed, channeled, piped or otherwise conveyed, at the alpha pressure (or under the alpha pressure gradient), and at this higher pressure above atmospheric pressure, into the Reactor Area 16. It will be understood that one (1) atmosphere of pressure (760 mmHg., 1.103 bar) is equal to about 14.70 lbs. per square inch (p.s.i).

The valve 18 is further utilized after a cycle in the present system 10 is completed, as further described below, to meter or add in an amount or volume of additional feedstream 11 from the plant waste water source area 14 equal or equivalent in volume or amount to the volume or amount extracted at the end of a given cycle as effluent permeate, later described herein; therefore restoring the feedstream (or recycled remaining feedstream) to its original starting amount or volume (as indicated by example earlier as, for example, 300–400 gallons, but which will vary in accordance with starting conditions).

A mixture containing at least $O_3$ and $O_2$ (ozone and diatomic oxygen, recognizing that molecular oxygen is $O_2$ and ozone is $O_3$) is generated by an ozone generator utilizing air or an $O_2$ source (such as an oxygen separator); and the $O_3/O_2$ mixture 20 is educted, causing a partial vacuum and thus drawing the $O_3/O_2$ mixture 20 into the Reactor Area 16. It will be understood within the scope of the invention that the mixture 20 can otherwise be generated, conveyed and supplied to the Reactor 16. Many ozone generators are available on the market which can be utilized in this part of the process. An example, of many such generators which are employable or adaptable for use, includes the Model 1250 Ozone Generator made by CEC, 2749 Curtiss Street, Downers Grove, Ill. 60615. Many other types and models of ozone generators, and other equipment creating, forming or generating ozone mixtures 20 can be utilized satisfactorily within the present method and system installation 10.

Examples, without limitation, of ozone generator use parameters include the following specification: Design Pressure: 150 PSIG; Design Temp: 150 degrees F.; Design Feed Stock: Radioactive Waste Water; Designed TOC Destruction Rate: 300 ppm-gpm; Hydrostatic Test Pressures: 1.5× Design Pressure; Maximum Allowable Feed Pressure: 150 PSIG; Typical Feed Pressure 50 to 100 PSIG; Maximum Allowable Operating Pressure: 50 PSIG; Nominal Operating Pressure 30 to 45 PSIG; Max. Allowable Operating Effluent Press.: 50 PSIG; Nominal Operating Effluent Press.: 30 to 45 PSIG; Max. Allow. Operating Temp.: 140 degrees F.; Min. Allow. Oper. Temp.; 32 degrees F.; Nominal Oper. Temp.: 50 to 104 degrees F.; Nom. CIP Oper. Temp.: 60 to 135 degrees F.; Peak Flow Rate: 50 GPM; Typical Flow Rate 15 to 40 GPM; and Min. Flow Rate: 5 GPM.

The feedstream 11 is, therefore, pumped into the Reactor 16 at the alpha pressure, for example between 30 to 50 PSIG (or higher), and the ozone mixture 20 is generated and provided to the Reactor 16 and dissolved into the aqueous feedstream 11 so that the mixture 20 is solubilized (or made soluble) within and with the aqueous feedstream 11, to produce a substantially or generally homogeneous single phase liquid mixture, where the ozone mixture 20 in the aqueous feedstream is dissolved and miscible, one with the other, in a consistent liquid solution without the presence of bubbles or any white water created by ozone bubbles; and where the ozone mixture 20 is dissolved in the aqueous feedstream at a level below the saturation point of the ozone mixture 20. The elevated pressure of the Reactor 16, because of the alpha pressure that the feedstream is pumped in at, improves the rate and equilibrium of the solubility of the ozone mixture 20 and the feedstream 11 in the Reactor 16. It will also be understood within the scope of the invention that a pressure gradient can be brought to bare on, or established in, the Reactor 16 through means other than the pressure at which the feedstream 11 is pumped into the Reactor.

Additionally, within the Reactor Area 16, the aqueous feedstream 11, now containing and being dissolved with the ozone mixture 20 ($O_3$ and $O_2$), is exposed to physical surfacing or additional surface opportunities, so that further oxidation or oxidizing reaction can take place by virtue of the effect that the concentrated and dissolved ozone has on the ingredients and pollutants of the feedstream 11; and improved Ozonalysis can take place. Examples within the scope and spirit of the invention which set forth, in exemplar preferred embodiments how the contacting and additional surfacing opportunities can be achieved include those illustrated in FIGS. 4 and 5.

FIG. 4 illustrates a Reactor Area 16 where the aqueous feedstream 11 is provided to the Reactor 16 from piping or channeling which leads to a nozzle member 22 supported within the Reactor 16 for conveying and spraying the feedstream 11 to a temporary or intermediary upper area 16A within the Reactor 16 which initially contains the ozone mixture 20 provided to the Reactor 16. Initially, or during the initial stages or sequences of time during which the feedstream 11 and the ozone mixture 20 enter the Reactor 16, the feedstream 11, because of the initial effect of its density, will drop to the temporary or intermediary lower area 16B; contemporaneously or shortly followed by the effect of the alpha pressure gradient which is established in the Reactor 16, facilitating the mixing and solubilizing earlier discussed. This permits greater contact, surface exposure and reaction potential; and, therefore, greater oxidizing opportunities, between the feedstream 11 and the ozone mixture 20.

Another example of accomplishing the contacting, mixing and reaction functions of the Reactor area 16 of the present invention is illustrated in FIG. 5. In this preferred embodiment the aqueous feedstream 11 is provided initially to a top portion 16C of the Reactor 16 so that it substantially or generally fills the area 16 (with some space left at the top as illustrated). The ozone mixture 20 is provided to a lower portion 16D (or spaced portion in relation to the position of the top surfacing of the feedstream or the space left where the area 16 is not completely filled), directly into the feedstream 11; and permitted initially (or in an intermediary sequence) because of the lower density of the gas, as initially provided, to rise through the body of the feedstream 11 from the area 16D to the top or upper portion, while or until the alpha pressure gradient has its effect in homogeneously solutionizing or solubilizing the ozone mixture 20 within the feedstream 11. This embodiment of the present method 10 permits greater opportunity for surfacing (or providing or exposing more surface area) and contacting; and, therefore, provides more opportunities for further oxidation reactions between the ozone of the mixture 20 and the pollutants (organic and inorganic) of the aqueous feedstream 11 to occur. It will be understood within the scope of the present invention that other means of contacting and surfacing the mixture 20 and the feedstream 11 can be utilized, such as passing them over or through various columns or packed columns, etc., for exposing the feedstream 11 to further angles and surfaces of dissolving and reaction with the ozone contained in the ozone mixture 20.

Figure 2A:
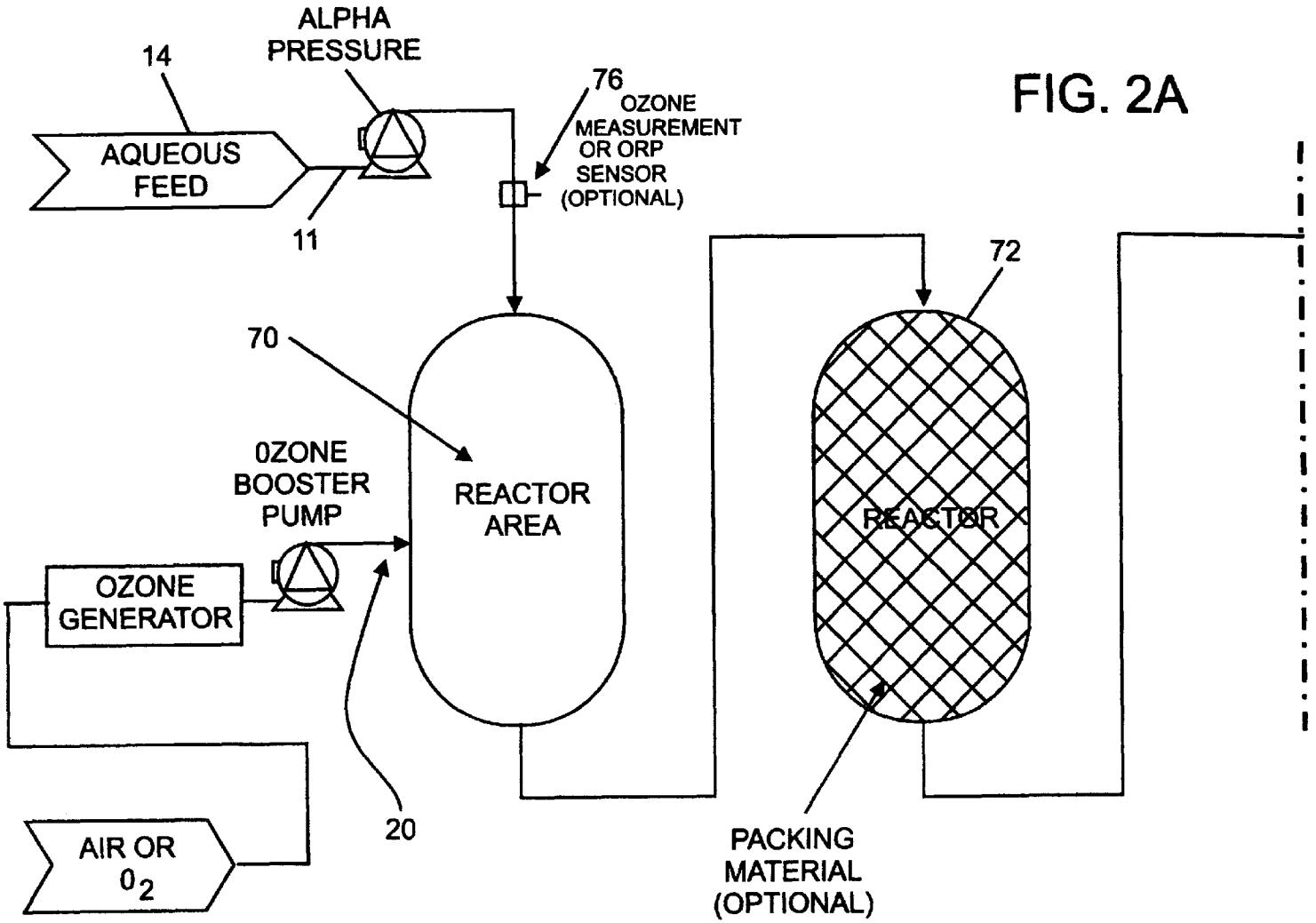
FIG. 2 is an exemplar flow diagram and schematic illustration of another preferred embodiment of the present invention.
Figures 2, 2B:
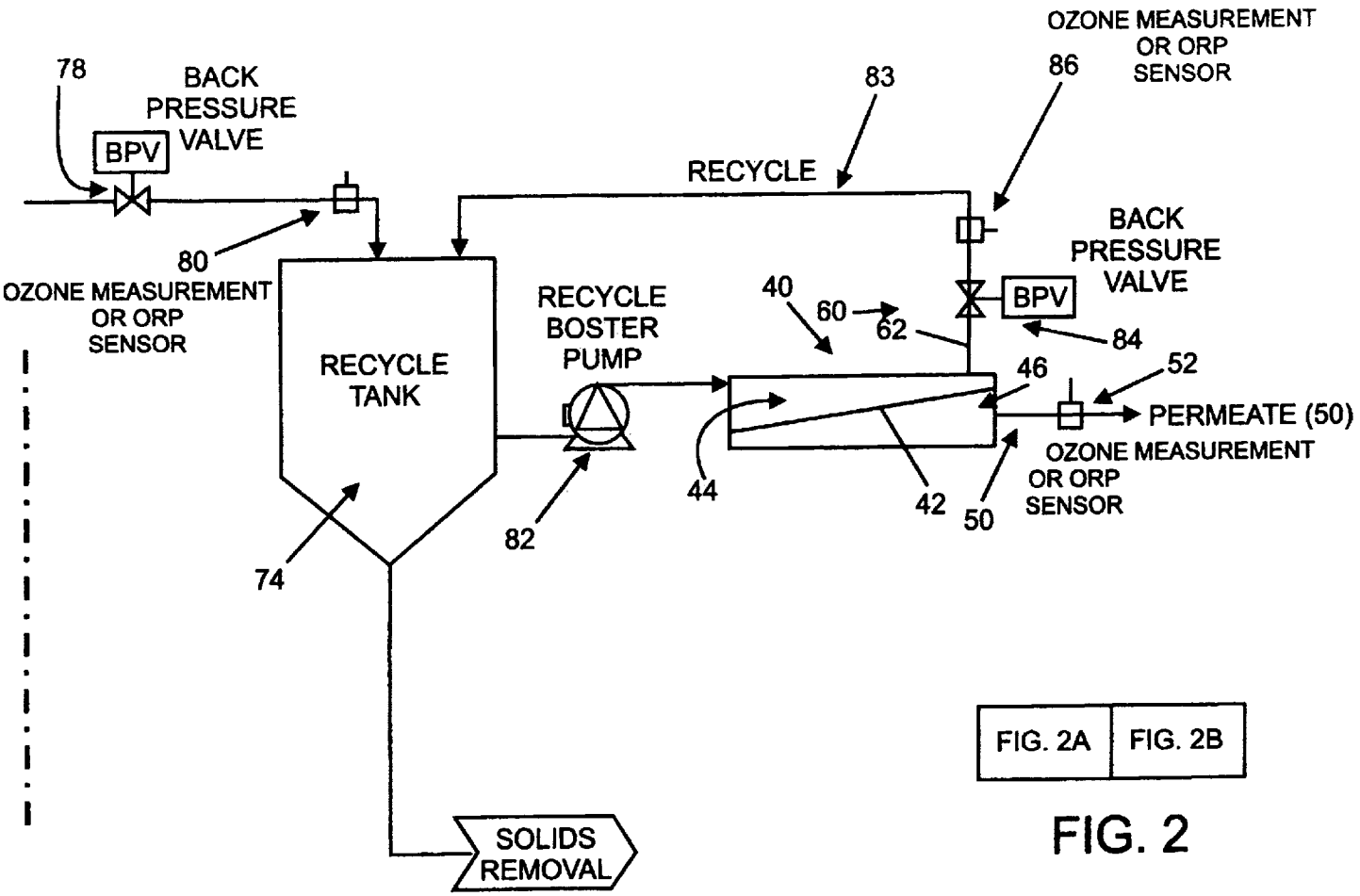
Figure 3A:
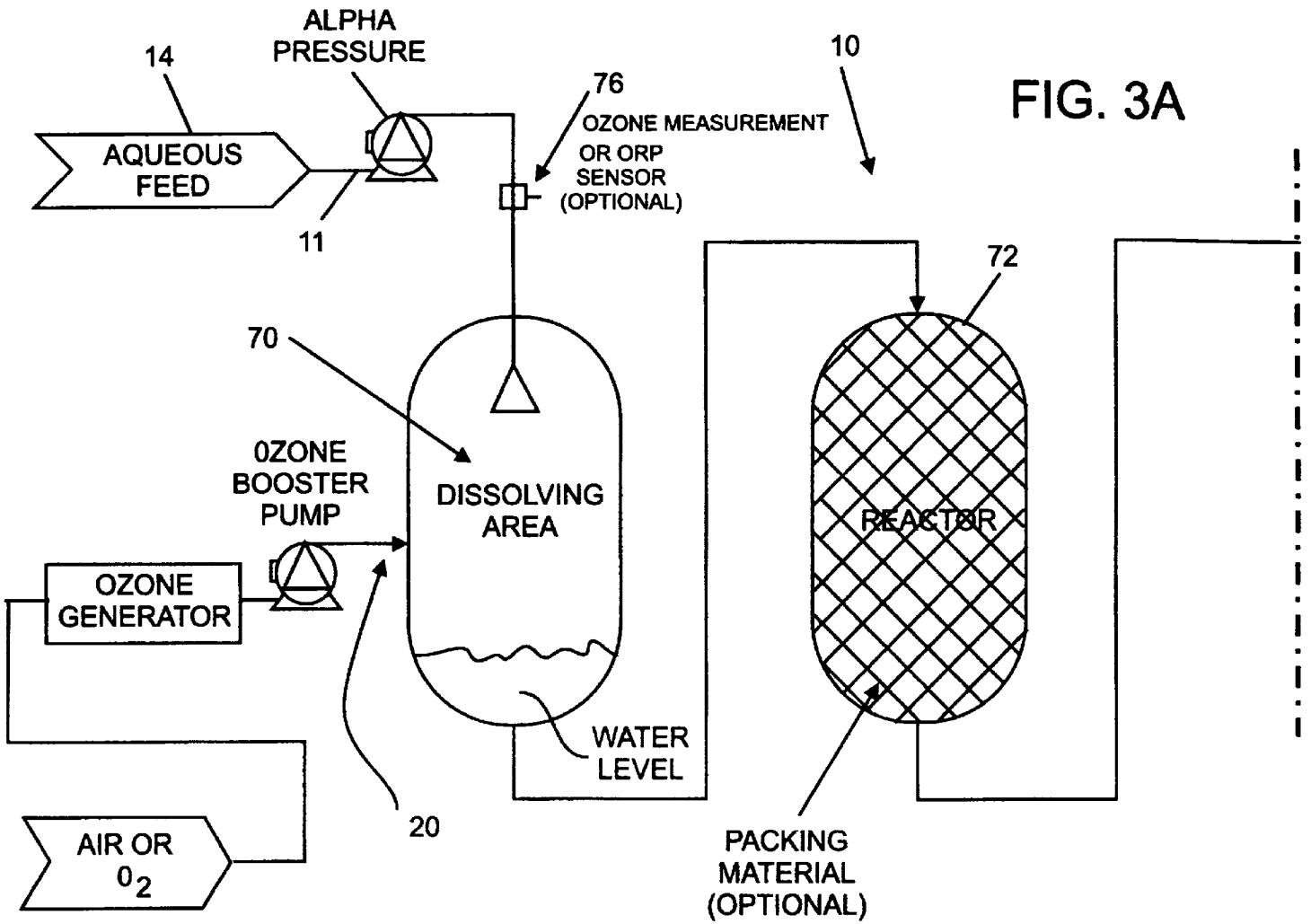
FIG. 3 is another exemplar schematic, diagrammatic illustration of an embodiment related to that illustrated in FIG. 2.
Figures 3, 3B:
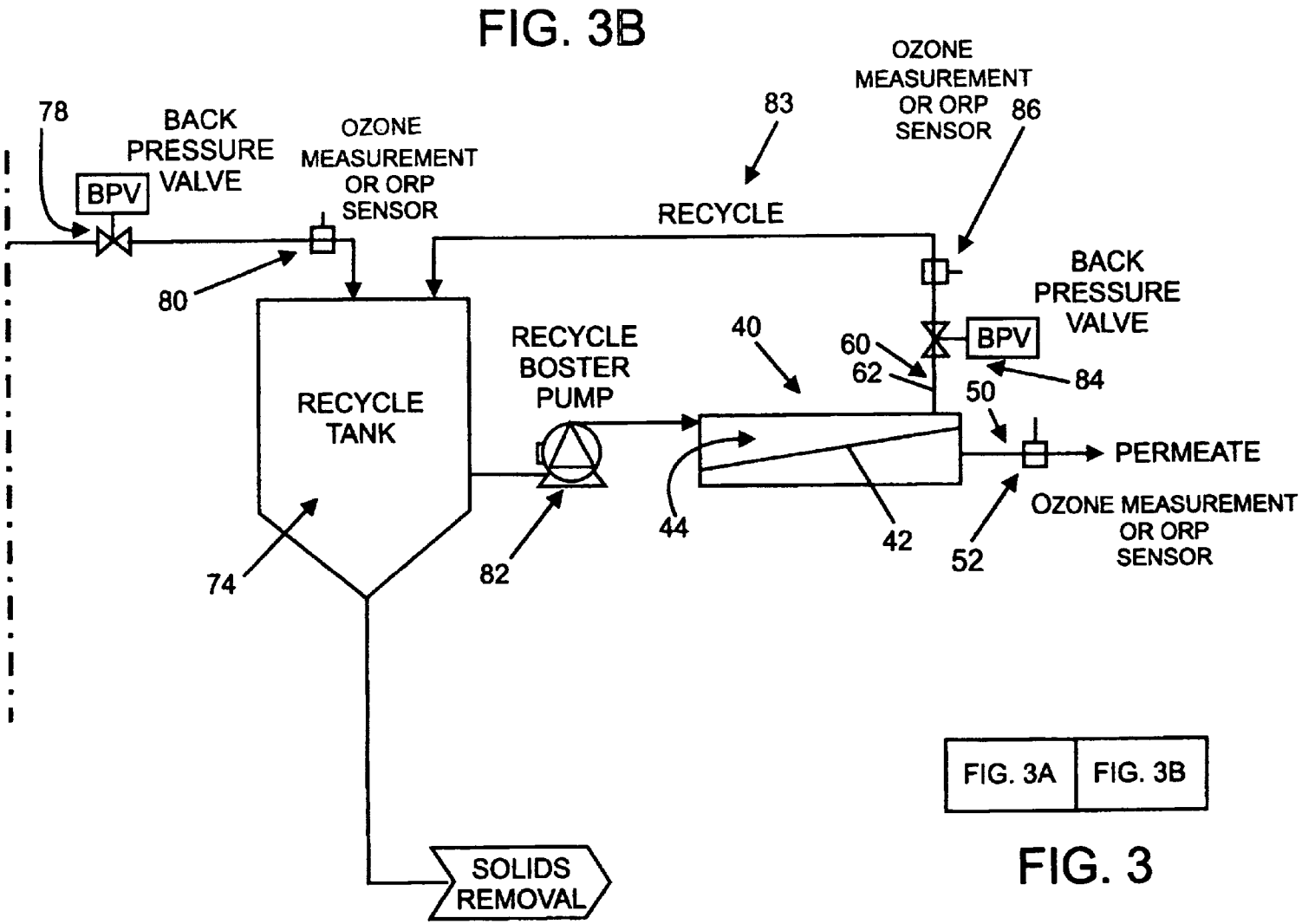

Also included within the activities and functions within the Reactor 16 of the present ozone method 10 is a concentrating and relegation (location or positional orientation) of solid substances (compounds or materials) to a bottom area of the Reactor 16 for removal during a preselected sequence of time during the operation or cycling of the method 10; as shown schematically, by example, in FIGS. 1, 2 and 3.

The present method 10 further includes directing the ozone dissolved, feedstream 11 from the Reactor Area 16, after the process discussed above, to a sensor area 30, where the ozone activity of the feedstream 11 is measured. This activity is commonly measured, within preferred embodiments of the invention, as an analysis of ozone content (such as, *for example,* by virtue of a titration indicator means) within the feedstream 11, or as, *for example,* an ORP (oxidation or oxygen reaction potential, or redox potential). For example, an ORP reading of +500 mV or above, indicates an extensive ozone oxidizing condition; one indicating a non-foulant (or non-polluted) state, character or feedstream condition. Positive values in this respect could run within a target range of from about +500 mV to about +1000 mV; with the solubility limit of ozone being characterized by a value of +1400 mV; and a condition where the feedstream had little or no ozone content being characterized by an ORP value of less than about +100 mV. It is, therefore, one important feature and novelty of the present method 10 that the ORP value is adjusted in a positive manner; to, therefore, indicate positive adjustment increase and substantially improved effectiveness of ozone concentration. Various ozone or ORP sensor areas (as illustrated by example in the drawings) are, therefore, provided along the on-line cycle of the present method and installation 10 to assure that this positive ozone concentration (and denoting positive ORP reading) is taking place; and to make positive adjustments (within a cycle or upon re-cycle) if this is not, for some reason, taking place. *Ozone content is normally measured by various sampling methods known in the art or described or mandated by the EPA; and ORP readings, as indicated by example above are determined by sensor or primary element means among other sensor means for verifiability measuring the ORP content.*

In a preferred embodiment of the method 10, the data obtained in ORP units at the sensor 30 is utilized on recycle of the process to adjust the output or production of ozone concentration from an ozone generator utilized to an amount which will render the feedstream and dissolved ozone mixture leaving the Reactor Area 16 at an ORP value of from about 750 mV to about 800 mV.

The present method 10 further, then, includes conveying the feedstream 11 to a pumping area 32, and pumping the feedstream 11, while maintaining the alpha pressure, to a filtration area 40, characterized and illustrated herein as having the filter media 42 (or filter membrane), the inflow side portion subarea 44 and the outflow side portion subarea 46; as illustrated in FIGS. 1, 2 AND 3. And, as so characterized, the filter 42, the inflow side 44 and the outflow side 46 are positioned, respectively, in the middle (indicated by a diagonal line), in front of (or positioned before the middle), and behind (in back of, after or following) the middle of the filtration area 40, as illustrated.

It will be understood within the scope *and spirit* of the present method and installation 10 of the invention that a number of different pumps*, channeling or directing devices, systems and means* can be utilized in the pumping area*, or directing or channeling means area* 32; and that the present invention is applicable to cleaning[.] *and* improving the flux rate, and prolonging the useful life (from 2 to 5 years longer) of various types of filtration units *or installations* (illustrated schematically as the filtration area 40). For example, the method 10 is especially useful in relation to cross flow filtration and tubular system filtration units *or installations* employed at manufacturing plant and nuclear waste site areas; but would be expected to improve the function, capacity and working time of any type of filtration or filter membrane system*, installation,* or other type[s] of filter or cleaning system[s] utilized in relation to processing*, or interacting with,* an aqueous waste feedstream.

An example of one such system with which the present method 10 can be used is the A19 Ultrafiltration System (PCI Membrane Systems 19 tubular UF/MF System) manufactured by PCI Membrane systems Limited, Laverstoke Mill, Whitchurch, Hampshire RG287NR, UK. Many other types of filter system or units including, but not limited to: Filters used for Radioactive liquids; disposable filters; reusable filters, precoat filters; septum filters; flatbed filters; centrifugal filters; metallic, non- or partially-cleanable filters; etched disk filters and miscellaneous filters (such as deep-bed filters clam shell, magnetic, sand filters, etc.); can be benefitted, or benefitted through adaptation, by the present method 10.

The present ozone method 10 further includes, in its installation on-line system, marshaling (gathering and/or conveying), an effluent permeate portion volume, shown generally at 50, from the feedstream 11 after it has passed (or as it is passing) through the filter media 42; designated in FIG. 1 as a permeate product; having been affected to do so by the constant alpha pressure and the oxidizing effect of the concentrated ozone in single phase solution with the feedstream 11. This permeate 50 passes through the filter media 42 to the outflow side portion subarea 46. The effluent permeate 50 is then advanced to another sensor area 52, where it is again measured for ozone activity, as discussed above. The resulting volume and amount of effluent permeate 50; expected to be from about 25% to about 30% of the original starting volume/amount of the aqueous feedstream 11 (given above, by example, as 300–400 gallons); is also measured at this time; or is measured contemporaneously in time in relation to recycling aspects of the present method 10 discussed herein. In this regard, as discussed above, the feed control valve 18 is utilized for the purpose of adding back an amount of new feedstream from the waste water 14 equivalent or equal to the volume or amount of the permeate 50 derived and taken from the system as a product, prior to starting a new cycle.

The effluent permeate 50 is then advanced to a selected or preselected site or location for storage, use or further conveyance.

The method 10 further includes marshaling of a reject portion volume, generally indicated as 60, consisting of that part, portion, amount or volume of the feedstream 11 not passing through the filter media 42 and being positioned, by virtue of that fact, at the inflow side portion subarea 44 of the filtration area 40; and advancing the reject 60 to a continuation of the system designated as a recycle line 62 (or recycle reject line).

The reject 60 is then conveyed to another sensor area 64 for measuring the ozone activity of the reject 60, as discussed above herein. The reject 60 is then channeled (conveyed or piped) back to the Reactor Area 16 or the feed control valve 18 just outside, within or a part of the Reactor Area 16, for metering, measuring and addition of further restoration volumes or amounts of site waste water 14 equal or equivalent to the amount of permeate portion volume 50 taken out of the system as indicated above; thus forming a new aqueous feedstream volume to be processed as indicated in a re-cycle mode of the present method 10, and taken through the same steps and process indicated above as a part of the Method 10, for the purpose of obtaining further permeate product 50 while further cleaning the filter media 42.

Another preferred embodiment of the present method 10 of the present invention is illustrated schematically in FIGS. 2 and 3. In this preferred embodiment of the ozone method 10 the same processes are carried out in accordance with the teachings of the present invention set forth above. However, in this embodiment, at least three (3) separate areas (such as tanks, vessels, containers, reservoirs or cylinders) are utilized to address the steps and parts of the present method 10.

In this respect, the Dissolving Area 70 is utilized to receive the aqueous feedstream 11, pumped in under the alpha pressure from the waste water area 14; and to mix and homogeneously dissolve the ozone mixture 20 generated and provided to the area 70 with the feedstream 11. The Reactor 72 is utilized to provide structure and/or positionally arranged surfacing to expose the feedstream 11 to greater or increased oxidation by the ozone mixture 20 dissolved in the feedstream 11. And the Recycle Tank 74 is utilized for concentrating any solids forming a part of the feedstream 11 and making them available for removal at a preselected time from the Tank 74 and system 10.

An ORP sensor 76 is located, by preselected option, between the waste water site 14 and the Dissolving Area 70. The Reactor 72 can be optionally provided with packing material or other content or positional orientations for providing greater surfacing potential for the feedstream 11 passing through it.

A back pressure valve (BPV) 78 and an ozone or ORP sensor 80 are provided on -line between the Reactor 72 and the Recycle Tank 74. The valve 78 is utilized to maintain alpha pressure; and the sensor 80 is utilized as indicated to measure ozone activity.

A Recycle Booster Pump 82 is provided between the Recycle Tank 74 and the filtration area 40 for maintaining pressure and conveying the feedstream through the filtration area 40, so that the reject volume portions 60 are channeled to the recycle line 83 and the permeate portions 50 are pumped through the filtration area 40 and out of the system.

A further back pressure valve 84 and ozone or ORP sensor 86 are provided on the recycle line 83. The recycle line 83 takes the reject portion 60 back to the Recycle Tank 74 for further processing as indicated in the original step and shown by schematic flow-chart illustrated representation in FIGS. 2 and 3.

Accordingly, the appended claims are intended to cover all changes, modifications and alternative options and embodiments falling with the tree breath, scope and spirit of the present invention. The reader is, therefore, requested to determine the scope of the invention by the appended claims and their legal equivalents, and not by the examples which have been given.

I claim:

1. A method for processing organic pollutants, and inorganic foulants in a reduced oxidative state, of an aqueous feedstream, increasing flux rates across a filtration membrane, and cleaning and prolonging the useful life of filtration and filter membrane installations, said method and system comprising:

(a) directing, channeling and pumping an aqueous feedstream having contaminants, from a feed water area to a reactor area for contacting, reacting, pressurizing and equalizing the aqueous feedstream, and concentrating solids and removing solids from the aqueous feedstream;

(b) generating an ozone mixture having at least $O_3$ and $O_2$, dissolving the ozone mixture into the aqueous feedstream under a pressure gradient having an alpha pressure, contacting the aqueous feedstream with the ozone mixture such that the aqueous feedstream is exposed for increased reaction of the ozone and concentrating and collecting solids at a bottom portion of said processing area;

(c) directing the aqueous feedstream from the reactor area and measuring ozone activity of the aqueous feedstream;

(d) conveying the aqueous feedstream to a pumping area;

(e) pumping the aqueous feedstream to a filtration area having a filter media, an inflow portion subarea and an outflow portion subarea, respectively, before and after the filter media;

(f) marshaling an effluent portion volume of the aqueous feedstream passing through the filter media of the filtration area to the outflow portion subarea, and advancing and measuring ozone activity of the effluent portion volume, and the volume and amount of the effluent portion volume;

(g) advancing the effluent portion to a preselected site.

2. The method of claim 1, wherein, after step (e):

(e)(1) marshaling a reject portion volume of the aqueous feedstream not passing through the filter media, and proximal to the inflow portion subarea of the filtration area and advancing the reject portion volume to a recycle line.

3. The method of claim 2, wherein, after advancing the reject portion volume to a recycle line:

(e)(2) measuring ozone activity of the reject portion volume.

4. The method of claim 3, further comprising:

(e)(3) channeling the reject portion volume to the reactor area, and adding a further aqueous feedstream volume from the feed water area equal in volume and amount to that of the effluent portion volume, thereby, forming a new aqueous feedstream volume.

5. The method of claim 4, wherein, after step (e)(3):

recycling the new aqueous feedstream volume through steps (b), (c), (d), (e), (f) and (g); and steps (e)(1), (e)(2) and (e)(3).

6. The method of claim 2, wherein the alpha pressure is equal to from about 10 p.s.i.g. to about 150 p.s.i.g.

7. The method of claim 6, wherein, in the generating of step (b) the ozone mixture is provided by an ozone generator at an output of from about 1 p.s.i.g. to about 150 p.s.i.g.

8. The method of claim 6, wherein step (b) further comprises supplying the aqueous feedstream to an area over water where the ozone mixture is generated and interfaced with the alpha pressure being equal to from about 30 p.s.i.g. to about 50 p.s.i.g.

9. The method of claim 6, wherein, in step (b), the alpha pressure is equal to from about 100 p.s.i.g. to about 2000 p.s.i.g.

10. The method of claim 6, wherein, step (b) further comprises channeling the aqueous feedstream, to a positioned area having an upper level surfacing, under the alpha pressure, and generating the ozone mixture at a positioning relative to the aqueous feedstream such that it passes throughout the aqueous feedstream to the upper level surfacing.

11. The method of claim 6, wherein, dissolving the ozone mixture into the aqueous feedstream under the pressure gradient having the alpha pressure, comprises solubilizing the ozone mixture and the aqueous feedstream such that a substantially homogeneous single phase liquid mixture is formed whereby the ozone mixture and the aqueous feedstream are dissolved and miscible, one with the other, at a level below the saturation point of the ozone mixture.

12. A process for removing and destroying organic foulants and inorganic foulants in a reduced oxidative state, applied in utilization upstream of filtration membranes, for increasing flux rates and prolonging the useful life of filter membranes, said process and system comprising:

(a) directing and channeling an aqueous feedstream from a site waste water area to a dissolving area;

(b) generating an ozone mixture having at least $O_3$ and $O_2$, and dissolving the mixture into the aqueous feedstream under a pressure gradient having an alpha pressure, such that the mixture having at least $O_3$ and $O_2$ is dissolved and miscible within the aqueous feedstream at a level below saturation point and the ozone mixture and the aqueous feedstream are solubilized to produce a substantially homogeneous single phase mixture;

(c) channeling the aqueous feedstream to a contact-surfacing enhancement area;

(d) contacting and surfacing the aqueous feedstream by slowing the aqueous feedstream and providing additional surface area for the occurrence of further oxidation reactions and destruction of organic and other substrates detrimental to filter membranes;

(e) directing the aqueous feedstream from the contact-surfacing enhancement area and measuring ozone activity of the aqueous feedstream;

(f) conveying the aqueous feedstream to a back pressure valve and maintaining pressure;

(g) transporting the aqueous feedstream to a recycle tank area, and concentrating and collecting solids at a bottom portion thereof;

(h) moving the aqueous feedstream into a pumping area;

(i) repressurizing the aqueous feedstream to the alpha pressure and pumping the aqueous feedstream to a filter membrane area having a filter media, an inflow portion and an outflow portion, respectively, in front of and beyond the filter media;

(j) marshaling an effluent portion of the aqueous feedstream passing through the filter membrane area to the outflow portion and advancing and measuring the effluent portion for ozone activity and volume amount; and (k) advancing the effluent portion to a preselected site.

13. The process of claim 12, wherein, after step (i):

marshaling a reject portion of the aqueous feedstream not passing through the filter, proximal to the inflow portion of the filter membrane area, and advancing the reject portion to a recycle line.

14. The process of claim 13, wherein:

after advancing the reject portion to a recycle line, measuring ozone activity and volume amount, and directing the reject portion back to the recycle tank area of step (g).

15. The process of claim 14, wherein, at selected time sequences, cleaning the recycle tank area and evacuating solids and like fluid substances from the bottom portion of the recycle tank area, and transporting the solids and like fluid substances to the site waste water area.

16. The process of claim 12, wherein:

the alpha pressure is equal to from about 10 p.s.i.g. to about 150 p.s.i.g.

17. The process of claim 16, wherein:

the alpha pressure is equal to from about 30 p.s.i.g. to about 50 p.s.i.g.

18. The process of claim 12, wherein:

the alpha pressure is equal to from about 100 p.s.i.g. to about 2000 p.s.i.g.

19. The process of claim 16, wherein, in the generating of step (b), the ozone mixture is provided by an ozone generator at an output of at least from about 1 p.s.i.g. to about 150 p.s.i.g.

20. The process of claim 12, wherein, after step (b) and before step (c):

channeling the aqueous feedstream and measuring ozone activity of the aqueous feedstream.

21. The process of claim 12, wherein:

the dissolving of step (b) further comprises exposing the aqueous feedstream to water-leveling by virtue of a water level means, for preventing the ozone mixture from leaving the aqueous feedstream.

22. The method of claim 5, wherein:

an ORP data result in mV units is obtained from the step (c), and utilized on the recycling of the new aqueous feedstream volume, so as to adjust the generating of step (b) to a rate of ozone output where the aqueous feedstream in step (b) in the recycling of the new aqueous feedstream volume is from about 750 mV. to about 800 mV.

*23. A method for cleaning a filter installation, where the filter is in an installed position on line and used for environmental filtering of a wastestream, and respective volumes thereof from respective source areas of the wastestream, having fluid contaminants generated by at least one of respective manufacturing and nuclear work facilities; wherein said fluid contaminants having at least one of respective organic and inorganic pollutants, contaminants and foulants, and hazardous and contaminating chemicals, substances or matter; and comprising a system of conveyance, under continuing, monitored pressure, for forward and frontal entry and passage through the filter installation to be cleaned of a homogeneous cleaning fluid or portions thereof; said method further comprising the steps of directing the wastestream, and the respective volume thereof, from the respective source area of the wastestream to a processing area for oxidation of the fluid contaminants; homogeneously dissolving and solutionizing an ozone gas volume into the wastestream under a pressure gradient, such that the wastestream becomes the homogeneous cleaning fluid, said cleaning fluid being a substantially single phase fluid; verifiably measuring the ozone activity in the cleaning fluid after leaving the processing area, proximate to at least one point of respective points extending to and beyond the filter to be cleaned; and selectively making adjustments to the pressure exerted in the processing area and the ozone gas volume supplied to the processing area during an on-going cycle, and recycling and adjusting wastestream volumes and any volumes of the cleaning fluid not passing through the filter to be cleaned back to the processing area, thereby reducing ozone bubbles and white water therefrom in the wastestream and cleaning fluid as it is directed in the system of conveyance from within the processing area to the filter installation to be cleaned.*

*24. The method of claim 23, wherein, said cleaning fluid becomes a substantially single phase liquid containing a small quantity of suspended solids or particulates; with, generally, most of the ozone gas volume being in solution.*

*25. The method of claim 23, wherein the cleaning fluid being a substantially single phase liquid fluid; where the fluid contaminants existing in the wastestream, and affected by the ozone gas volume, produce substantially no solids for removal.*

*26. The method of claim 23, wherein, prior to the step of directing the wastestream to a processing area, the method further comprising the step of measuring the oxidation reduction potential of the wastestream.*

*27. The method of claim 23, further comprising the step of measuring the oxidation reduction potential of the wastestream while it is present in the processing area.*

*28. The method of claim 23, wherein, in the step of homogeneously dissolving and solutionizing an ozone gas volume into the wastestream, the method further comprising the use of an eductor means to create a nozzle-type effect in introducing the ozone gas volume into the wastestream from a position above said wastestream.*

*29. The method of claim 23, wherein, between the source area and the processing area, the step of measuring the ozone activity.*

*30. The method of claim 24, wherein, generally contemporaneous with the homogeneously dissolving and solutionizing step, collecting at least part of any existing solids or solid-like substances and particulates in the wastestream when present.*

*31. The method of claim 23, wherein the step of making adjustments further comprises selectively recycling and communicating the cleaning fluid, or portions thereof, back to the processing area for adding additional wastestream volumes from the source and further dissolving and solutionizing with ozone gas volumes.*

*32. The method of claim 23, wherein said method further comprises generating an effluent portion volume after the forward entry and passage through the filter installation to be cleaned of the homogeneous cleaning fluid.*

*33. The method of claim 23, wherein said processing area comprises at least one reactor area for contacting the wastestream and ozone gas volume during the step of homogeneously dissolving and solutionizing the ozone gas volume into the wastestream.*

*34. The method of claim 33, wherein said at least one reactor area comprises at least one member, selected from a group consisting of: a chamber, a reservoir, a vessel, a column, a hose, a pipe, a tube, and other means for contacting and solutionizing the ozone gas volume with the wastestream such that the wastestream becomes the homogeneous cleaning fluid.*

*35. The method of claim 33, wherein said processing area comprises:*

*a dissolving area for receiving the wastestream directed and conveyed from the source area, for mixing and homogeneously dissolving the ozone volume generated and provided with the wastestream to said dissolving area;*

*a reactor area for providing structure and positionally arranged surfacing to expose the wastestream to increased surfacing for greater oxidation by the ozone gas volume dissolved in the wastestream; and*

*a selectively engageable recycle tank for concentrating any solids forming a part of the wastestream and making them available for removal at a preselected time from said recycle tank.*

*36. The method of claim 23, wherein, after verifiably measuring the ozone activity in the cleaning fluid after leaving the processing area, and at points prior to reaching the filter to be cleaned, the step of selectively recycling, and conveying, the cleaning fluid, or portions thereof, back to the processing area.*

*37. The method of claim 23, wherein the pressure gradient is from about 10 p.s.i.g. to about 2000 p.s.i.g.*

*38. The method of claim 32, further comprising, in addition to measuring the ozone activity in the cleaning fluid becoming the effluent portion volume at a point beyond the filter to be cleaned, the step of advancing and measuring volume or amount of the effluent portion volume after being generated.*

*39. The method of claim 32, further comprising the step of advancing and measuring ozone activity of an effluent portion volume of the cleaning fluid in contemporaneous relation to the time period during which said effluent portion volume passes through said filter installation to be cleaned.*

*40. The method of claim 32, further comprising the step of marshaling an effluent portion volume of the cleaning fluid passing through the filter installation to an outflow portion subarea, and advancing and measuring ozone activity of the effluent portion volume, and the volume and amount of the effluent portion volume.*

*41. The method of claim 40, further comprising the step of marshaling a reject portion volume of the cleaning fluid not passing through the filter installation, proximal to a inflow portion subarea of the filter installation, and advancing and conveying the reject portion volume to the processing area.*

*42. The method of claim 41, wherein, before the reject portion volume reaches the processing area, measuring ozone activity of the reject portion volume.*

*43. The method of claim 41, further comprising the step, generally contemporaneous with said advancing and conveying the reject portion volume to the processing area, of adding a further volume of wastestream from the respective source area of the wastestream equal in volume and amount to that of the effluent portion volume; thereby, forming a new wastestream volume for processing.*

*44. The method of claim 23, wherein the processing area of said directing step being an area over water, and where the step of homogeneously dissolving and solutionizing an ozone volume into the wastestream is conducted with the pressure gradient being equal to from about 10 p.s.i.g. to about 2000 p.s.i.g.*

*45. A method for processing organic and inorganic fluid contaminants in an aqueous feedstream and cleaning an environmentally efficacious filter media installation, serving at least one of respective municipal, manufacturing and nuclear facilities generating the fluid contaminants in the feedstream, comprising the steps of conveying the feedstream to a dissolving area; generating an ozone volume having O sub. 3 and O sub. 2, and homogeneously dissolving and solutionizing the ozone volume into the feedstream under a pressure gradient to affect the feedstream by forming a single phase ozone-feedstream mixture volume therewithin; communicating the feedstream to a contact-surfacing enhancement area; measuring ozone activity; selectively making adjustments to the feedstream; conveying the feedstream through the filter media installation and generating an effluent portion volume; and advancing and measuring ozone activity of the effluent portion volume, and the volume and amount of the effluent portion volume.*

*46. The method of claim 45, further comprising generating a reject portion volume from the feedstream not passing through the filter installation.*

*47. The method of claim 46, further comprising measuring ozone activity of the reject portion volume and recycling said reject portion volume back to the dissolving area.*

*48. A method of cleaning a filter installation, where the filter installation is in position and used for environmentally filtering organic and inorganic wastestreams, and respective wastestream volumes thereof, generated by at least one of respective manufacturing and nuclear activities and facilities, and respective wastestream sources thereof, comprising providing a system of conveyance to the filter installation of a volume of a substantially homogenized cleaning fluid and frontal entry and passage through said filter installation of a portion of the volume of the substantially homogenized cleaning fluid, thereby cleaning said filter, said cleaning fluid containing an oxidizing ozone gas volume having O3 and O2 and the wastestream volume;*

*maintaining the ozone gas volume under verifiably tested pressure and amount within the cleaning fluid such that it is so maintained throughout the system, with the wastestream, to the filter installation and the frontal entry and passage through said filter installation of the portion of the cleaning fluid;*

*wherein, said filter installation is selected from a group of units consisting of: cross flow and tubular filtration units, ultrafiltration membrane systems, filters used for radioactive liquids, precoat filters, septum filters, flat-bed filters, centrifugal filters, etched disk filters, deep-bed filters, clam shell filters, magnetic filters, sand filters and other filters specifically related to cleaning wastestream products as a result of manufacturing or radiation activities;*

*regularly and systematically testing the cleaning fluid for ORP, and adjusting the pressure and amount of the ozone gas volume in accordance with the ORP readings such that the cleaning fluid is maintained in conveyance within the system in a sufficiently oxidized state for cleaning the filter installation upon said frontal entry and passage through the filter installation of the portion of the cleaning fluid; and*

*conveying the cleaning fluid to the filter installation and generating an effluent portion volume from the portion of the cleaning fluid being so conveyed by the frontal entry and passage through said filter installation.*

*49. The method of claim 48, wherein the cleaning fluid is substantially a single phase liquid having or containing a small quantity or amount of suspended solids, with most of the ozone gas being in solution, and maintained in that condition throughout the system by said testing of the cleaning fluid for ORP.*

*50. The method of claim 48, further comprising the steps of:*

*(a) directing the respective wastestream volume from the respective wastestream source to a processing area for ozone mixture and oxidation;*

*(b) homogeneously dissolving and solutionizing the ozone gas volume into the wastestream volume under a pressure gradient to form the volume of the cleaning fluid; and*

*(c) conveying the volume of the cleaning fluid, while maintaining the pressure gradient, to the filter installation for the frontal entry and passage through said filter installation of the portion of the volume of the cleaning fluid and direct cleaning of the filter installation.*

*51. The method of claim 50, further comprising the step of generating a reject portion volume comprising that part of the cleaning fluid not passing through the filter installation.*

*52. The method of claim 51, further comprising the steps of measuring the amount of the effluent portion volume; and directing the reject portion volume to the processing area.*

*53. The method of claim 52, further comprising the step of adding an amount of additional wastestream from the wastestream source, proportional to the amount of the effluent portion volume; and repeating steps (a), (b) and (c).*

*54. The method of claim 51, further comprising the step of adding an amount of additional wastestream in step (a), proportional to the amount of effluent portion volume.*

*55. The method of claim 50, further comprising the step of adding an amount of additional wastestream volume proportional to the amount of the cleaning fluid passing through the filter installation.*

*56. The method of claim 48, further comprising the steps of:*

*conveying the wastestream volume from the wastestream source to a dissolving area;*

*homogeneously dissolving and solutionizing the ozone gas volume with the wastestream volume, in said dissolving area, under a pressure gradient; and*

*directing the wastestream volume to a reactor area for providing structurally and positionally disposed surfacing areas to expose the wastestream volume to increased oxidation availability, and mixing and solubilizing of the ozone gas volume with the wastestream volume, such that the cleaning fluid is formed for passing through said filter installation.*

*57. The method of claim 56, further comprising between the step of homogeneously dissolving and solutionizing the ozone gas volume and the step of directing the wastestream volume to a reactor area; the step of testing or verifiably measuring the wastestream volume for ozone content.*

*58. The method of claim 56, wherein, proximate to or within said reactor area, selectively and optionally separating and collecting at least part of any solid or particular organic contaminants existing in the wastestream volume, when such contaminants exist therein.*

*59. The method of claim 48, further comprising the steps of:*

*conveying the wastestream volume from a source to a dissolving area;*

*homogeneously dissolving and solutionizing the ozone volume with the wastestream volume, in said dissolving area, under a pressure gradient;*

*directing the wastestream volume, so treated, to a reactor area for providing structurally and positionally disposed surfacing to expose the wastestream volume to increased surfacing, positioning and exposure of various internal and external volume portions thereof, for greater oxidation by the ozone volume dissolved and solutionized in the wastewater volume; thereby forming the cleaning fluid;*

*selectively moving the cleaning fluid to a recycle tank area for concentrating any solid and particular contaminants, when existing and forming a part thereof, and making the solid and particulate contaminants available for removal at a preselected time from the recycle tank area; and*

*directing the cleaning fluid to the filter installation.*

*60. The method of claim 50, wherein the pressure gradient is achieved by means selected from a group consisting of: providing the wastestream volume to the processing area under pressure, providing the ozone gas volume to the processing area under pressure, and providing both the wastestream volume and the ozone gas volume to the processing area under pressure.*

*61. The method of claim 59, further comprising the step of generating a reject portion volume comprising that part of the cleaning fluid not passing through the filter installation.*

*62. The method of claim 61, wherein, the reject portion volume comprising that part of the cleaning fluid not passing through the filter installation is conveyed for rejection or exiting from the system of conveyance of the method.*

*63. The method of claim 23, wherein a necessary item of equipment, or system utilized to facilitate the steps of the present method are sized and adjusted with regard to its specifications or limits of structural makeup and functional use, so as to be able to accommodate the magnitude, volume and nature of the wastestream and cleaning fluid of said method.*

*64. A method for processing fluid contaminants containing organic and inorganic pollutants and foulants or other contaminants in an aqueous feedstream, comprising the steps of directing the feedstream to a processing area for oxidation of the fluid contaminants; homogeneously dissolving and solutionizing an ozone gas volume into the feedstream, such that the feedstream becomes a substantially single phase fluid; measuring ozone activity in the feedstream after leaving the processing area; selectively and optionally making adjustments to the feedstream based on the results of the measuring step; delivering the feedstream to a filtration area for direct passage therethrough; and marshaling an effluent portion volume of the feedstream passing through the filtration area to an outflow portion subarea, and advancing and measuring ozone activity of the effluent portion volume, and the volume and amount of the effluent portion volume.*

*65. A method for processing fluid contaminants containing organic and inorganic pollutants and foulants or other contaminants in an aqueous feedstream, comprising the steps of directing the feedstream to a processing area for oxidation of the fluid contaminants; homogeneously dissolving and solutionizing an ozone gas volume into the feedstream, such that the feedstream becomes a substantially single phase fluid; measuring ozone activity in the feedstream after leaving the processing area; selectively and optionally making adjustments to the feedstream based on the results of the measuring step; delivering the feedstream to a filtration area for direct passage therethrough; and marshaling a reject portion volume of the feedstream not passing through the filtration area, proximal to a inflow portion subarea of the filtration area, and advancing the reject portion volume to a recycle line for return to the processing area.*

*66. A method for processing fluid contaminants containing organic and inorganic pollutants and foulants or other contaminants in an aqueous feedstream, comprising the steps of directing the feedstream to a processing area for oxidation of the fluid contaminants; homogeneously dissolving and solutionizing an ozone gas volume into the feedstream, such that the feedstream becomes a substantially single phase fluid; measuring ozone activity in the feedstream after leaving the processing area; and selectively and optionally making adjustments to the feedstream based on the results of the measuring step; delivering the feedstream to a filtration area for direct passage therethrough; marshaling a reject portion volume of the feedstream not passing through the filtration area, proximal to a inflow portion subarea of the filtration area, and advancing the reject portion volume to a recycle line for return to the processing area; and, after advancing the reject portion volume to a recycle line, and before reaching the processing area, measuring ozone activity of the reject portion volume.*

*67. A method for processing fluid contaminants containing organic and inorganic pollutants and foulants or other contaminants in an aqueous feedstream, comprising the steps of directing the feedstream to a processing area for oxidation of the fluid contaminants; homogeneously dissolving and solutionizing an ozone gas volume into the feedstream, such that the feedstream becomes a substantially single phase fluid; measuring ozone activity in the feedstream after leaving the processing area; and selectively and optionally making adjustments to the feedstream based on the results of the measuring step; delivering the feedstream to a filtration area for direct passage therethrough; marshaling a reject portion volume of the feedstream not passing through the filtration area, proximal to a inflow portion subarea of the filtration area, and advancing the reject portion volume to a recycle line for return to the processing area; and channeling the reject portion volume to the processing area, and adding a further aqueous feedstream volume equal in volume and amount to that of the effluent portion volume; thereby, forming a new aqueous feedstream volume.*

*68. A method of accomplishing an upstream efficiency-enhancing treatment and cleaning of a filter installation by providing for direct passage through said filter installation of a single-phase homogenized ozoneaqueous solution, comprising an ozone gas volume having O3 and O2, and a wastewater volume, having contaminants; each solubilized and miscible, one with the other, such that the wastewater volume is oxidized; and further comprising the steps of:*

*directing the wastewater volume, having organic contaminants, from a source to a processing area for ozone mixture and oxidation,*

*homogeneously dissolving and solutionizing the ozone gas volume into the wastewater volume under a pressure gradient to form the single-phase homogenized ozoneaqueous solution,*

*directing the single-phase homogenized ozoneaqueous solution, while maintaining the pressure gradient, to the filter installation for passage therethrough and direct cleaning thereof, and*

*producing an effluent portion volume, after passage of part of the single-phase homogenized ozoneaqueous solution through the filter installation, and a reject portion volume of that part of the single-phase homogenized ozoneaqueous solution not passing through the filter installation.*

*69. A method of accomplishing an upstream efficiency-enhancing treatment and cleaning of a filter installation by providing for direct passage through said filter installation of a single-phase homogenized ozoneaqueous solution, comprising an ozone gas volume having O3 and O2, and a wastewater volume, having contaminants; each solubilized and miscible, one with the other, such that the wastewater volume is oxidized; and further comprising the steps of:*

*directing the wastewater volume, having organic contaminants, from a source to a processing area for ozone mixture and oxidation,*

*homogeneously dissolving and solutionizing the ozone gas volume into the wastewater volume under a pressure gradient to form the single-phase homogenized ozoneaqueous solution, and*

*directing the single-phase homogenized ozoneaqueous solution, while maintaining the pressure gradient, to the filter installation for passage therethrough and direct cleaning thereof,*

*producing an effluent portion volume, after passage of part of the single-phase homogenized ozoneaqueous solution through the filter installation, and a reject portion volume of that part of the single-phase homogenized ozoneaqueous solution not passing through the filter installation, and*

*measuring the amount of the effluent portion volume; and directing the reject portion volume to the processing area.*

*70. A method of accomplishing an upstream efficiency-enhancing treatment and cleaning of a filter installation by providing for direct passage through said filter installation of a single-phase homogenized ozoneaqueous solution, comprising an ozone gas volume having O3 and O2, and a wastewater volume, having contaminants; each solubilized and miscible, one with the other, such that the wastewater volume is oxidized; and further comprising the steps of:*

*(a) directing the wastewater volume, having organic contaminants, from a source to a processing area for ozone mixture and oxidation,*

*(b) homogeneously dissolving and solutionizing the ozone gas volume into the wastewater volume under a pressure gradient to form the single-phase homogenized ozoneaqueous solution,*

*(c) directing the single-phase homogenized ozoneaqueous solution, while maintaining the pressure gradient, to the filter installation for passage therethrough and direct cleaning thereof,*

*(d) producing an effluent portion volume, after passage of part of the single-phase homogenized ozoneaqueous solution through the filter installation, and a reject portion volume of that part of the single-phase homogenized ozoneaqueous solution not passing through the filter installation,*

*(e) measuring the amount of the effluent portion volume; and directing the reject portion volume to the processing area, and*

*(f) adding an amount of additional wastewater volume from the source, proportional to the amount of the effluent portion volume; and repeating steps (a), (b) and (c).*

*71. A method of accomplishing an upstream efficiency-enhancing treatment and cleaning of a filter installation by providing for direct passage through said filter installation of a single-phase homogenized ozoneaqueous solution, comprising an ozone gas volume having O3 and O2, and a wastewater volume, having contaminants; each solubilized and miscible, one with the other, such that the wastewater volume is oxidized; and further comprising the steps of:*

*(a) directing the wastewater volume, having organic contaminants, from a source to a processing area for ozone mixture and oxidation,*

*(b) homogeneously dissolving and solutionizing the ozone gas volume into the wastewater volume under a pressure gradient to form the single-phase homogenized ozoneaqueous solution, and*

*(c) directing the single-phase homogenized ozoneaqueous solution, while maintaining the pressure gradient, to the filter installation for passage therethrough and direct cleaning thereof,*

*(d) producing an effluent portion volume, after passage of part of the single-phase homogenized ozoneaqueous solution through the filter installation, and a reject portion volume of that part of the single-phase homogenized ozoneaqueous solution not passing through the filter installation; and*

*(e) adding an amount of additional wastewater volume in step (a), proportional to the amount of effluent portion volume.*

*72. A method of accomplishing an upstream efficiency-enhancing treatment and cleaning of a filter installation by providing for direct passage through said filter installation of a single-phase homogenized ozoneaqueous solution, comprising an ozone gas volume having O3 and O2, and a wastewater volume, having contaminants; each solubilized and miscible, one with the other, such that the wastewater volume is oxidized; and further comprising the steps of:*

*conveying the wastewater volume from a source to a dissolving area;*

*homogeneously dissolving and solutionizing the ozone volume with the wastewater volume, in said dissolving area, under a pressure gradient,*

*directing the wastewater volume, so treated, to a reactor area for providing structurally and positionally disposed surfacing to expose the wastewater volume to increased surfacing, positioning and exposure of various internal and external volume portions thereof, for greater oxidation by the ozone volume dissolved and solutionized in the wastewater volume; thereby forming the single-phase homogenized ozoneaqueous solution,*

*selectively and optionally moving the single-phase homogenized ozoneaqueous solution to a recycle tank area for concentrating any solid and particulate contaminants, when existing and forming a part thereof, and making the solid and particulate contaminants available for removal at a preselected time from the recycle tank area, and*

*directing the single-phase homogenized ozoneaqueous solution to the filter installation for passage therethrough.*

*73. A method of cleaning a filter installation, where the filter installation is in position and used for environmentally filtering a wastestream, said wastestream having at least one*

*of respective organic and inorganic pollutants, contaminants, foulants and hazardous chemicals or substances, and a respective wastestream volume thereof, generated by at least one of respective manufacturing and nuclear activities and facilities; comprising:*

*providing a system of conveyance to the filter installation of a volume of a substantially homogenized cleaning fluid and frontal entry and passage through said filter installation of a portion of the volume of the substantially homogenized cleaning fluid, thereby cleaning said filter, said cleaning fluid containing an oxidizing ozone gas volume having O3 and O2 and the wastestream;*

*maintaining the ozone gas volume under verifiably tested pressure and amount within the cleaning fluid such that it is so maintained throughout the system, with the wastestream, to the filter installation and the frontal entry and passage through said filter installation of the portion of the cleaning fluid;*

*wherein, said filter installation is selected from a group of units consisting of: cross flow and tubular filtration units, ultrafiltration membrane systems, filters used for radioactive liquids, precoat filters, septum filters, flat-bed filters, centrifugal filters, etched disk filters, deep-bed filters, clam shell filters, magnetic filters, sand filters and other filters specifically related to cleaning wastestream products as a result of manufacturing or radiation activities;*

*regularly conducting at least one of respective measurements or samplings of ozone content of the cleaning fluid and readings and testings of the cleaning fluid for ORP; and adjusting the pressure and amount of the ozone gas volume in accordance with the at least one of the respective measurements of ozone content and readings for ORP such that the cleaning fluid is maintained in conveyance within the system in a sufficiently oxidized state for cleaning the filter installation upon said frontal entry and passage through the filter installation of the portion of the cleaning fluid; and*

*conveying the cleaning fluid to the filter installation and generating an effluent portion volume from the portion of the cleaning fluid being so conveyed by the frontal entry and passage through said filter installation; and*

*wherein a necessary item of equipment, or system utilized to facilitate the steps of said method are sized and adjusted with regard to its specifications or limits of structural makeup and functional use, so as to be able to accommodate the magnitude, volume and nature of said wastestream and said oxidizing ozone gas volume.*

*74. A method for processing fluid contaminants containing organic and inorganic pollutants and foulants or other contaminants in an aqueous feedstream, comprising the steps of directing the feedstream to a processing area for oxidation of the fluid contaminants; homogeneously dissolving and solutionizing an ozone gas volume into the feedstream, such that the feedstream becomes a substantially single phase fluid; measuring ozone activity in the feedstream after leaving the processing area; selectively and optionally making adjustments to the feedstream based on the results of the measuring step; conveying the single phase fluid through a filter media installation and generating an effluent portion volume; and advancing and measuring ozone activity of the effluent portion volume, and the volume and amount of the effluent portion volume.*

*75. A method for cleaning a filter installation, where the filter is in an installed position on line and used for environmental filtering of a wastestream, and respective volumes thereof from respective source areas of the wastestream, having fluid contaminants generated by at least one of respective manufacturing and nuclear work facilities, and comprising a system of conveyance, under continuing, monitored pressure, for forward and frontal entry and passage through the filter installation to be cleaned of a homogeneous cleaning fluid or portions thereof; said method further comprising the steps of directing the wastestream, and the respective volume thereof, from the respective source area of the wastestream to a processing area for oxidation of the fluid contaminants; homogeneously dissolving and solutionizing an ozone gas volume into the wastestream under pressure, such that the wastestream becomes the homogeneous cleaning fluid, said cleaning fluid being a substantially single phase fluid; verifiably measuring the ozone activity in the cleaning fluid after leaving the processing area, proximate to at least one point of respective points extending to and beyond the filter to be cleaned; and selectively making adjustments to the pressure exerted in the processing area and the ozone gas volume supplied to the processing area during an on-going cycle, and recycling and adjusting wastestream volumes and any volumes of the cleaning fluid not passing through the filter to be cleaned back to the processing area, thereby reducing ozone bubbles and white water therefrom in the wastestream and cleaning fluid as it is directed in the system of conveyance from within the processing area to the filter installation to be cleaned;*

*wherein said method further comprises generating an effluent portion volume after the forward entry and passage through the filter installation to be cleaned of the homogeneous cleaning fluid, said effluent portion volume being equal to from about 25 percent to about 30 percent of the respective volume of the waste stream from the respective source area of the wastestream.*

*76. The method of claim 23, wherein the pressure gradient is brought about by an ozone generator at an output of at least from about 1 p.s.i.g. to about 150 p.s.i.g.*

* * * * *